US008131389B1

(12) United States Patent
Hardwick et al.

(10) Patent No.: US 8,131,389 B1
(45) Date of Patent: Mar. 6, 2012

(54) DIGITAL AUDIO SERVER

(75) Inventors: John C. Hardwick, Sudbury, MA (US);
Timothy E. Kalvaitis, Hollis, NH (US);
William S. McKinney, Reading, MA (US); Brian D. Clooney, Acton, MA (US)

(73) Assignee: Digital Voice Systems, Inc., Westford, MA (US)

( * ) Notice: Subject to any disclaimer, the term of this patent is extended or adjusted under 35 U.S.C. 154(b) by 3365 days.

(21) Appl. No.: 10/067,990

(22) Filed: Feb. 8, 2002

(51) Int. Cl.
*G06F 17/00* (2006.01)
(52) U.S. Cl. ............................................. 700/94
(58) Field of Classification Search ............... 700/94, 700/214, 57, 14, 213; 381/77, 58, 1, 314, 381/312, 119; 709/203, 217–219, 220; 707/104.1, 707/10, 30; 714/25, 37, 746; 369/30.06, 369/30.21, 30.79; 704/229; 713/150; 710/1, 710/13
See application file for complete search history.

(56) References Cited

U.S. PATENT DOCUMENTS

| 4,202,551 | A |   | 5/1980  | Darnall, Jr.     |         |
|-----------|---|---|---------|------------------|---------|
| 4,225,142 | A |   | 9/1980  | Zolt             |         |
| 4,425,813 | A |   | 1/1984  | Wadensten        |         |
| 4,683,520 | A |   | 7/1987  | Grassens et al.  |         |
| 4,705,257 | A |   | 11/1987 | Leo et al.       |         |
| 4,812,932 | A |   | 3/1989  | Hishinuma et al. |         |
| 4,896,777 | A |   | 1/1990  | Lewis            |         |
| 4,937,806 | A |   | 6/1990  | Babson et al.    |         |
| 4,964,017 | A |   | 10/1990 | Jindrick et al.  |         |
| 5,131,619 | A |   | 7/1992  | Daugherty et al. |         |
| 5,253,257 | A | * | 10/1993 | Murakami         | 714/771 |
| 5,347,503 | A |   | 9/1994  | Koyama et al.    |         |
| 5,402,308 | A |   | 3/1995  | Koyanagi et al.  |         |
| 5,440,172 | A |   | 8/1995  | Sutrina          |         |
| 5,485,444 | A | * | 1/1996  | Kuhn et al.      | 369/54  |
| 5,524,060 | A |   | 6/1996  | Silfvast et al.  |         |
| 5,572,442 | A | * | 11/1996 | Schulhof et al.  | 709/219 |
| 5,737,304 | A |   | 4/1998  | Soga et al.      |         |
| 5,792,971 | A |   | 8/1998  | Timis et al.     |         |
| 5,839,100 | A |   | 11/1998 | Wegener          |         |
| 5,860,726 | A |   | 1/1999  | Richardson       |         |
| 5,875,067 | A |   | 2/1999  | Morris et al.    |         |
| 5,943,208 | A |   | 8/1999  | Kato et al.      |         |
| 5,956,314 | A |   | 9/1999  | Ishimatsu et al. |         |
| 5,974,004 | A | * | 10/1999 | Dockes et al.    | 715/727 |
| 6,021,041 | A |   | 2/2000  | Genix et al.     |         |
| 6,041,302 | A |   | 3/2000  | Bruekers         |         |
| 6,222,807 | B1|   | 4/2001  | Min-Jae          |         |
| 6,314,326 | B1| * | 11/2001 | Fuchu            | 700/17  |

(Continued)

FOREIGN PATENT DOCUMENTS

EP    0 442 642 A2    8/1991

(Continued)

OTHER PUBLICATIONS

Yamaha Musiccast Digital Audio Music Server Review, Copyright 2003, p. 1-13.*

(Continued)

*Primary Examiner* — Davetta Goins
*Assistant Examiner* — Lun-See Lao
(74) *Attorney, Agent, or Firm* — Fish & Richardson P.C.

(57) ABSTRACT

A digital audio server may be used to automatically download music from a collection of audio media, such as CDs or DVDs. The server also may automatically identify the media using track offset information.

30 Claims, 12 Drawing Sheets

U.S. PATENT DOCUMENTS

| | | | |
|---|---|---|---|
| 6,408,332 | B1 | 6/2002 | Matsumoto et al. |
| 7,206,792 | B2 | 4/2007 | Kudo et al. |
| 2002/0188461 | A1 | 12/2002 | Matsumoto |
| 2004/0210593 | A1* | 10/2004 | Hirano et al. .................. 707/101 |

FOREIGN PATENT DOCUMENTS

| | | | |
|---|---|---|---|
| EP | 0 845 782 | A1 | 6/1998 |
| EP | 0 874 175 | A1 | 10/1998 |
| JP | 2001-283540 | | 10/2001 |

OTHER PUBLICATIONS

Tony Robinson; "Shorten: Simple lossless and near-lossless waveform compression"; http://svr-www.eng.cam.ac.uk/reports/ajr/TR156/tr156.html; 14 pages; Jun. 28, 2002.

Philip De Lancie; "Meridian Lossless Packing: Enabling High-Resolution Surround on DVD-Audio"; *MIX* 1998; http://www.meridian-audio.com/p_mlp_mix.htm; 8 pages; Jun. 28, 2002.

Bell et al.; "Dictionary Techniques"; *Text Compression*, Chapter 8; Prentice Hall; pp. 206-243; 1990.

Mathieu Claude Hans; "Optimization of Digital Audio for Internet Transmission"; *A Thesis Presented to The Academic Faculty of the Georgia Institute of Technology*; pp. 1-104 (61 sheets/2-sided); May 1998.

Non-Final Office Action, United States Patent and Trademark Office, U.S. Appl. No. 09/725,238, Nov. 17, 2004, 12 pages.

Final Office Action, United States Patent and Trademark Office, U.S. Appl. No. 09/725,238, Aug. 24, 2007, 18 pages.

* cited by examiner

FILE STRUCTURE:

BLOCK STORAGE

FILE NAMES IN FILE SYSTEM:
/a/d
/a/e/h
/a/e/i
/b
/c/f
/c/g

FILES IN FILE SYSTEM:
/a/d
/a/e/h
/a/e/i
/b
/c/f
/c/g
} STORED ON DISK

/NET/d
/NET/e/f
/NET/e/g
/NET/e/h
} STORED ON HOST 2

FILES IN FILE SYSTEM:
/a/d
/a/e/f
/a/e/g
/a/e/h
/b
/c
} STORED ON DISK

DIGITAL AUDIO SERVER

CROSS REFERENCE TO RELATED APPLICATION

This application claims priority from U.S. patent application Ser. No. 09/725,238, filed Nov. 29, 2000 and titled "DIGITAL AUDIO SERVER," which is claims priority from U.S. Provisional Application No. 60/174,600, filed Jan. 5, 2000, both of which are incorporated by reference.

TECHNICAL FIELD

This invention relates to a digital audio server for storing digital audio data.

BACKGROUND

The last 10-20 years has seen a major transition in the audio industry from analog formats, such as cassette tapes, FM radio, and records, to digital formats, such as compact disks (CD), mini-disks (MD), and digital versatile disks (DVD). The widespread use of personal computers and the Internet has furthered this trend with the introduction of new electronic music services that allow music or other audio content to be distributed electronically through a computer and the Internet. Many of these digital audio products and services make use of audio compression technologies (e.g., MP3, Dolby AC3, ATRACS, MPEG-AAC, and Windows Media Player) to reduce the bit rate required for high fidelity music reproduction to the range of 64-256 kbps from the 1440 kbps used on uncompressed CD recordings. The use of compression, in conjunction with the increased storage capacity of semiconductor devices (e.g., SRAM, DRAM and flash memories) and computer disks, has led to several new products for use in digital audio applications.

In a typical digital audio application, an analog audio signal is sampled, typically at 32, 44.1, or 48 kHz, and then is digitized with 16 or more bits using an analog-to-digital converter. If the audio source is stereo, then this process is repeated for both the right and left channels. Similarly, for a surround sound audio system, which may have six or more channels, each channel is sampled and digitized. A typical CD includes two stereo channels, each of which is sampled at 44.1 kHz with 16 bits per sample, and produces data requiring 1411.2 kbps. This leaves room for slightly more than 1 hour of music on a 650 MB CD. In a playback application, the digital music samples are reconverted to an analog signal using a digital-to-analog converter, and the analog signal is amplified and played through one or more speakers.

Several known audio compression techniques can compress a stereo music signal to the range of 64-256 kbps without significantly changing the quality of the audio signal (i.e., while maintaining CD-like quality). The MPEG-1 standard describes three audio compression methods, referred to as Layers 1, 2, and 3, for reducing the bit rate of a digital audio signal. The method described under Layer 3, which is commonly known as MP3, is generally considered to achieve CD-like quality at 128 kbps and virtually indistinguishable quality at 256 kbps. Since a bit rate of 128 kbps represents a compression ratio of 11 relative to a CD, an MP3-based portable music player can store over an hour of music in 64 MB of flash memory. Alternatively, a personal computer (PC) equipped with a 20 GB hard disk can store over 300 hours of MP3 compressed music at 128 kbps. In addition, compressed audio material is much easier to send and receive across the Internet, particularly with new higher speed connections, such as, for example, V.90, cable modems, and DSL.

These capabilities have contributed to a new, PC-centered audio trend in which audio content in general, and music in particular, is stored on a PC's disk drive. The audio content is either obtained from the Internet using an electronic music provider, such as MP3.COM (see http://www.mp3.com), or from any of the growing number of Internet radio stations. Alternatively, audio data corresponding to digital music can be obtained by using a CD-ROM drive to extract the audio data from one or more CDs (a technique often referred to as "ripping" of CDs). Similarly, analog music from, for example, records or tapes can be digitized using an A-to-D converter, and the resulting digital data can be stored on the PC's disk drive.

Once the audio data are provided to the PC, the audio data can be compressed, if necessary, using any of the available audio compression algorithms, and can be organized and stored for later playback using the PC's sound card. In addition, the PC can upload the material to a portable music player through a serial port or other connection for playback in the car, office, or other location.

The ripping of CDs onto a PC's disk drive has been facilitated by the rise of software to identify a CD from a large database consisting of album title, artist, and song titles for several hundred thousand CDs. The identification process typically uses the number of tracks and the track lengths to compute a disk ID or key that is then used to look up the album title, artist, and song titles from the CD database (CDDB). The album title, artist, and song title information is useful for naming the files produced when the CD contents are extracted, and eliminates the need for the user to manually enter all of this information.

One key commonly used to identify audio CDs was originally developed as part of the public domain XMCD software package for Unix systems, and is a 32 bit number generated in a specific known way from the number and length of the tracks. Unfortunately, many of the fields within this disk ID are not independent, which means that the actual information content (i.e. entropy) is much lower, such that a relatively large database representing several hundred thousand CDs may include several CDs that generate duplicate disk IDs. Another problem is that some CDs have several versions, each with slightly different track lengths, so that each version produces a different disk ID. The lack of uniqueness and sensitivity to minor variations in the CD are problems associated with using this particular key.

A more complex approach uses a fuzzy matching technique to address these problems. This approach does not require a disk ID to find the selected CD in the database. Instead, approximate length information is computed for the CD being identified and then this information is fed over the Internet to a server, where it is compared against approximate length information computed for different entries in the database. The CD is then identified as corresponding to the entry in the database that has the most closely matching length information. This approach solves some of the problems associated with searching for the typical disk ID. However, the storage requirements are increased significantly due to the need to store length information for each CD in the database. In addition, the search complexity is significantly higher since the approximate length information must be computed and compared for many entries in the database during the lookup of any CD. This requires large computational resources, which makes it difficult to add local CD identification capability to a low cost consumer product. As a result, this approach is more applicable to an Internet CD database server or to high cost devices with significant memory and processing capability.

SUMMARY

In one general aspect, an apparatus for recording signals from multiple discs in a multi-disc playback device includes a signal input unit, a communications unit, and a storage unit. The signal input unit is configured to receive signals produced by the multi-disc playback device, with the signals corresponding to content of a disc being played by the multi-disc playback device. The communications unit is configured to communicate with the multi-disc playback device to obtain information about a disc played by the multi-disc playback device. The storage unit is configured to store the signals received from the multi-disc playback device, with the storage of the signals being controlled based on the obtained information about a disc played by the multi-disc playback device.

Implementations may include one or more of the following features. For example, the discs may be audio compact discs, the multi-disc playback device may be a disc changer capable of audio playback from the audio compact discs, and the signals may be audio signals. The signals may be analog audio signals and the storage unit may be configured to store the analog audio signals as digital values. The signals also may be S/PDIF digital audio signals.

The apparatus may include a network interface unit, such as an Ethernet interface or an HPNA interface. The storage unit, which may be a hard disk drive, may be accessible over a network through the network interface unit. The apparatus also may include a compression unit configured to compress the audio signals using an audio compression method, and the storage unit may be configured to store the compressed audio signals on the hard disk drive.

The communications unit may include a Control-A1 interface or an RS-232 interface. The multi-disc playback device may be included as part of the apparatus.

The apparatus also may include a controller configured to detect an error on a disc and to discontinue storage of received signals corresponding to the disc when an error is detected. The controller may be configured to detect the error by obtaining through the communications unit playback time information for the disc from the multi-disc playback device, measuring a duration of a period in which received signals correspond to the disc, and comparing the playback time information with the measured duration and determining that the error exists if the comparison indicates a difference that exceeds a threshold amount.

The signal input unit and the communications unit may share a common physical interface. For example, the physical interface may be a Firewire compatible interface. The apparatus may read signals from the multi-disc playback device at a rate greater than a real-time playback rate of the multi-disc playback device.

In another general aspect, a system for recording or playback of signals from multiple discs in a multi-disc playback device includes a signal input unit, a communications unit, a storage unit and a database. The signal input unit is configured to receive signals produced by the multi-disc playback device, with the signals corresponding to content of a disc being played by the multi-disc playback device. The communications unit is configured to communicate with the multi-disc playback device to obtain information about a disc played by the multi-disc playback device. The storage unit is configured to store the signals received from the multi-disc playback device. Finally, the database contains data concerning multiple discs.

Implementations may include one or more of the following features. For example, the database may be at least partially compressed. At least part of the database may be divided into multiple blocks, each of which can be decompressed without fully decompressing the other blocks.

The communications unit may obtain from the multi-disc playback device signature information for the disc being played by the multi-disc playback device. The system may use the signature information to identify the disc by obtaining from the database data corresponding to the signature information. The discs may be audio compact discs, the multi-disc playback device may be a disc changer capable of audio playback from the audio compact discs, and the data in the database may include one or more of the name of the compact disc, the name of the artist who recorded the compact disc, the number of audio tracks on the compact disc, or the name of one or more audio tracks on the compact disc. The signature information may include time offset information on one or more tracks on the compact disc, and may be used to compute at least one disc ID for the disc. The database may be searched for data corresponding to the computed disc ID. For example, the database may be searched by computing a hash value from the disk ID and using the computed hash value and a hash table to obtain an index value indicating the location of the desired data. The index value may indicate a particular compressed block that is decompressed to obtain the desired data.

The system also may include a signal output unit configured to output a second signal while the signal input unit receives signals. The second signal may be a modified version of the signals received by the signal input unit. The modification may include delay, scaling or equalization.

The system also may include a network interface unit configured to receive additional data for use in supplementing the database. The system may be configured to use the network interface unit to check for the availability of additional data and to automatically download the additional data if available.

In another general aspect, an apparatus for identifying a signal produced by a signal playback device includes a communications unit configured to obtain from the signal playback device signature information for the signal produced by the signal playback device, and an at least partially compressed local database containing data for multiple signals. The apparatus also includes a controller configured to search the database using the signature information to find data corresponding to the signature information to identify the signal produced by the signal playback device.

Implementations may include one or more of the following features. For example, at least part of the local database may be divided into multiple blocks, each of which can be decompressed without fully decompressing the other blocks.

The signal may be an audio signal produced by the playback of an audio compact disc, and the signal playback device may be an audio compact disc player. The data in the local database may include one or more of the name of the compact disc, the name of the artist who recorded the compact disc, the number of audio tracks on the compact disc, and the name of one or more audio tracks on the compact disc. The signature information may include time offset information on one or more tracks on the compact disc, the signature information may used to compute at least one disc ID for the disc, and the controller may be configured to search the local database for the data corresponding to the computed disc ID. The local database may be searched by computing a hash value from the disk ID and then using the computed hash value to access a hash table to obtain an index value indicating the location of the desired data in the local database. The index value may indicate a particular compressed block in the local database that is decompressed to obtain the desired data.

The apparatus may include a hard disk drive on which at least part of the local database is stored. The apparatus also may include non-volatile semiconductor memory on which at least part of the local database is stored. The apparatus also may include a network interface, such as an Ethernet interface or an HPNA interface. The network interface may be used to download into the apparatus additional data to supplement the local database. The controller may be configured to use the network interface to query a network database server if data corresponding to the obtained signature information is not found in the local database. The apparatus also may include a display unit configured to display some or all of the data corresponding to the obtained signature information found by the controller.

In another general aspect, a digital audio playback apparatus that can be controlled over a network includes an input unit configured to read stored digital audio data, an audio output unit configured to produce audio signals from the read digital audio data, a network interface unit configured to enable receipt of commands from a remote device, and a controller configured to control the audio signal produced by the audio output unit in response to a received command from a remote device.

Implementations may include one or more of the following features. For example, the network interface unit may include an Ethernet interface, and the input unit may be configured to read digital audio data from a networked storage device over the Ethernet interface. The network interface unit also may include an HPNA interface.

The apparatus also may include a hard disk drive, and the input unit may be configured to read digital audio data stored on the hard disk drive.

The digital audio data may include compressed digital audio data, and the audio output unit may be configured to decompress the compressed digital audio data to produce the audio signals. The input unit may be configured to read digital audio samples representing the audio output of a compact disc player, and the controller may be configured to control the playback of the compact disc player in response to a received command from a remote device. The controller may include a web server that processes commands received from a remote device using a web interface such as a web browser. The controller also may function to start and stop the audio signal produced by the audio output unit in response to a received command from a remote device. The controller may be configured to select particular compressed digital audio data for decoding to produce audio signals in response to a received command from a remote device. The controller also may function to select a particular compact disc in a multi-disc changer in response to a received command from a remote device.

In another general aspect, a digital audio device is used to transfer audio data automatically from audio media to a digital storage device. The digital audio device obtains first digital audio data from a first audio medium and stores the first digital audio data on the digital storage device. Upon completing storing at least part of the first audio data, the digital audio device automatically obtains second digital audio data from at least a second audio medium and stores the second digital audio data on the digital storage device.

Implementations may include one or more of the following features. For example, the audio media may include CDs or DVDs contained in a CD or DVD player, and the first and second digital audio data may represent at least in part the audio samples contained on the respective CDs or DVDs. Obtaining the digital audio data may correspond to collecting audio data produced by playing the medium in the CD or DVD player.

Storing digital audio data on a digital storage device may further include compressing the digital audio data and storing the compressed digital audio data on the digital storage device. Compression may include using, for example, the MP3 audio compression method or a lossless compression method.

The digital storage device may be, for example, a hard disk, a flash memory, or a random access memory.

Storing digital audio data may include sending the digital audio data over an electronic network to be stored in a digital storage device accessible over the electronic network. The digital audio data may be generated from one or more analog audio signals using analog-to-digital conversion.

The digital audio device may collect identity information identifying the first and second audio media from a source other than the first and second audio media, and may store the identity information on the digital storage device. The digital audio device may use the identity information to generate file names for the stored digital audio data. The digital audio device may store the identity information at least in part in an embedded ID tag stored with the digital audio data.

Collecting identity information may include using track offsets from an audio medium to compute an ID and searching a database to find identity information corresponding to the computed ID. The database may be stored on the digital storage device, or may be stored on a digital storage-device accessible by the digital audio device through a network. A number of tracks and the track offsets may be sent over a network to an audio media database server and the identity information may be received back over the electronic network from the audio media database server. The identity information may include the name of an audio medium and a name of one or more individual tracks of the audio medium.

In another general aspect, an audio medium including audio tracks may be identified by collecting track information for audio tracks of the audio medium, quantizing the track information for each audio track to form quantization values, combining the quantization values to form a key, and using the key to identify the audio medium from a database containing possible audio media identities.

Quantizing track information may include mapping the track information into a fixed number of reference points and quantizing the reference points. Quantizing the reference points may include computing a difference between at least some of the reference points and a linear combination of other reference points, and quantizing the computed differences. Mapping of the track information into a fixed number of reference points may include interpolating between the track information and resampling to produce a fixed number of reference points. Interpolation may include using linear interpolation.

The key may be combined with data representing the number of tracks in the audio media to form a longer key, and the longer key may be used to identify the audio media from a database of possible identities.

Using the key to identify the audio media from the database may include searching the database to find an entry in the database matching the key, and using information stored in the entry to identify the audio media. The information stored in the database which is used to identify the audio media matching the key may include at least the name of the album and the artist and the names of one or more of the individual tracks.

Using the key to identify the audio media may further include generating one or more alternative keys which are close to the first key, and searching the database to match the alternative keys whenever no match is found in the database for the first key. Generating alternative keys that are close to the first key may include determining a subset of the quantization values to be modified, computing a non-zero offset for each quantization value in the subset, modifying at least one of the quantization values in the subset by adding the computed non-zero offset, and combining modified quantization values with any unmodified quantization values to form an alternative key.

Use of a key to identify the audio medium from a database of possible identities may include submitting the key over an electronic network to an audio media database server and receiving the identity of the audio medium back over the electronic network from the audio media database server.

In another general aspect, a digital audio recording device includes a communications port connected to read digital audio data from an audio playback device containing multiple audio media, circuitry connected to the communications port and operable to store the digital audio data on a digital storage device, and a processor connected to the communications port and operable to control the playback of individual audio media from the audio playback device.

The digital audio recording device may compress the digital audio data prior to storage on the digital storage device, using, for example, a lossless compression method or the MP3 compression method.

Digital audio data may be read through a digital audio interface, such as, for example, a S/PDIF interface. The digital audio device may include at least one analog audio input and an analog-to-digital converter for converting the analog audio input signal to digital audio data.

The audio playback device may be a CD player or a DVD player, and the multiple audio media may be multiple CDs or DVDs contained in the player. Controlling the playback of individual audio media may include changing the CD or DVD played in the player, and may further include sending commands to the audio playback device over a Control-A1 interface or an RS-232 interface.

The digital audio recording device also may identify the audio media being played in the audio playback device. To this end, the device may include a database stored on the digital storage device and containing identifying information for audio media. When the audio media contain one or more audio segments, identifying the audio media may be based in part on the number of audio segments contained on the audio media and on offset information for the individual audio segments. The audio media may be CDs or DVDs, and the audio segments may be the tracks of the CDs or DVDs. The number of tracks and offset information may be sent over a network to an audio media database server, and the identity of the audio media may be received back over the electronic network from the audio media database server. Identifying the audio media may include determining the name of a CD or a DVD and the name of one or more individual tracks.

The digital audio interface may be able to transfer the digital audio data at higher data rates than the normal playback rate of the digital audio data.

A digital audio server, also referred to as a digital audio recording device, offers considerable advantages over PC-based systems. For example, the digital audio server avoids the use of PC sound cards, many of which suffer from unwanted noise and have difficulty producing high fidelity sound. Also, the digital audio server eliminates the PC from the music playback operation, which is useful for several reasons. First, the PC is often prone to system crashes and may be used for other purposes, such as game playing, which can interrupt or cause glitches in the music that is playing. Second, the computer is large and loud (due to its fan, disk drive, and other components), and it is often not placed in the right room for listening to music. This means that, in order to use a computer for music, the user must choose between placing the computer in the main listening area, listening to music in the study or bedroom where the computer is located, or connecting the computer so that it can provide music to a listening area away from the computer's location. Remote placement of the computer eliminates some of the problems, but adds the need for long analog signal runs between the rooms, which may degrade the signal if corrupted by noise or interference. In addition, if the computer is located away from the listening area, it is difficult to control the music selection on the computer from the listening area, which means that, in practice, the user must often return to the location of the computer to control the music. One more limitation is that the computer does not easily support multi-room playback, meaning that generally only one audio source can be played, and if more than one room is connected to the computer, all rooms must listen to the same source.

A final problem with PC-based music systems is that they often require a significant amount of time and effort on the part of the user to fill or load them with digital audio. For example, a 60 GB hard drive can store over 1000 hours of near CD quality music. Downloading this amount of music on a 56 kbps modem would require nearly 100 days of continuous downloading. Furthermore, there is currently no legitimate source on the Internet for most mainstream music. For at least these reasons, the Internet has serious drawbacks as a source for loading a large collection of music onto a PC. Currently, the most common solution is for an individual to transfer his or her own CD collection into his or her computer's disk drive by ripping (i.e., reading the audio data) from each CD using a CD-ROM drive. Each disk is individually inserted into the CD-ROM drive and the ripper program then takes 10-100 minutes per CD, depending on the speed of the PC, to extract the data and compress each CD track into a file that is stored on the PC's disk drive. This same process is used on many new digital jukeboxes and other music storage devices, all of which contain an internal CD-ROM drive and a hard drive. As a result, all of these products require a significant amount of time and effort on the part of the user to enter a large collection of CDs.

This process of entering audio data from CDs is further complicated because most CD-ROM drives were designed originally for reading data files on a PC, rather than reading continuous audio from a music CD. As a result, a ripped audio CD is often prone to jitter, sync, or timing errors introduced by the CD-ROM drive as it attempts to read the audio data. These errors may cause the PC to crash or may introduce clicks or other distortion into the music. All of these problems reduce the attractiveness of these systems to many users who are unwilling to invest the time and obtain the knowledge necessary to transfer their CD collection onto a computer disk drive.

In contrast, a typical stereo system is designed to be placed in the listening area and to operate continually for hours or days without interruption. The physical design of stereo equipment is generally smaller (no external monitor) and very quiet (no fan). In addition, multi-room equipment is readily available to allow different sources to be played in different rooms. A traditional stereo system may use a CD changer or jukebox to store hundreds of disks without the need to transfer the music from the CD prior to use.

A problem with current audio equipment is that it is generally isolated (i.e., disconnected) from the PC and the Internet, and so it is generally difficult to listen to Internet radio, or to play an MP3 file stored on the PC. Furthermore, the ability to store, organize and control a large music collection with a traditional stereo system is quite limited. While a CD changer can accommodate many disks, it generally has limited organization and display capabilities, and is very slow to switch between different CDs, creating a significant interruption in the music. In addition, only one CD can be played at a time, and the CDs themselves are subject to being lost, scratched or misplaced as they are moved to/from the changer and used in other devices.

The digital audio server addresses many of the limitations of PC-based music systems and traditional stereo systems.

Other features and advantages include the ability to play two or more different audio sources simultaneously; support for a serial copy management scheme (SCMS); extensive audio processing capability for mix, fade, equalization or other purposes; and full software upgradability.

Other features and advantages will be apparent from the description and drawings, and from the claims.

DESCRIPTION OF DRAWINGS

Like reference symbols in the various drawings indicate like elements.

DETAILED DESCRIPTION

Digital Audio Server (DAS)

Figure 1:
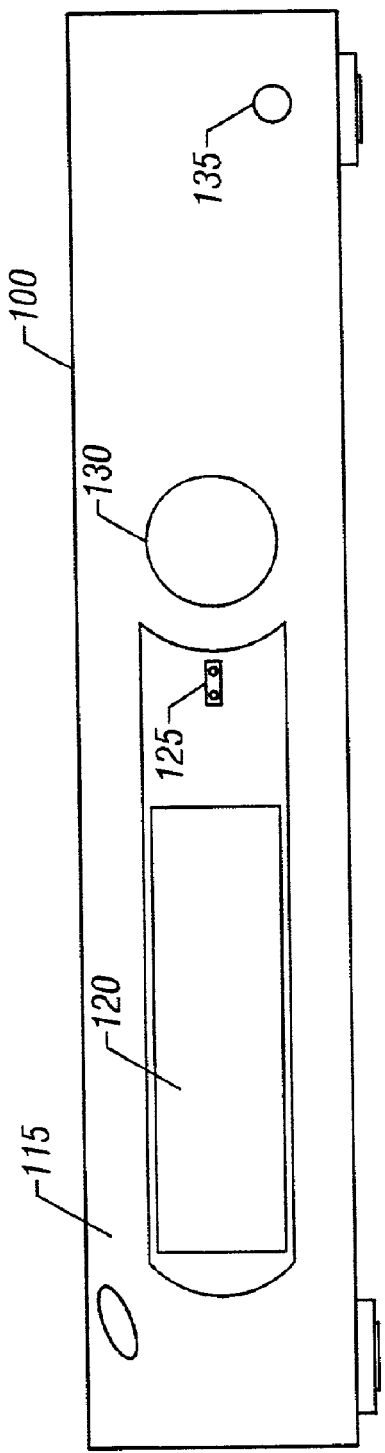
FIGS. 1 and 2 are front and rear views of a digital audio server.
Figure 2:
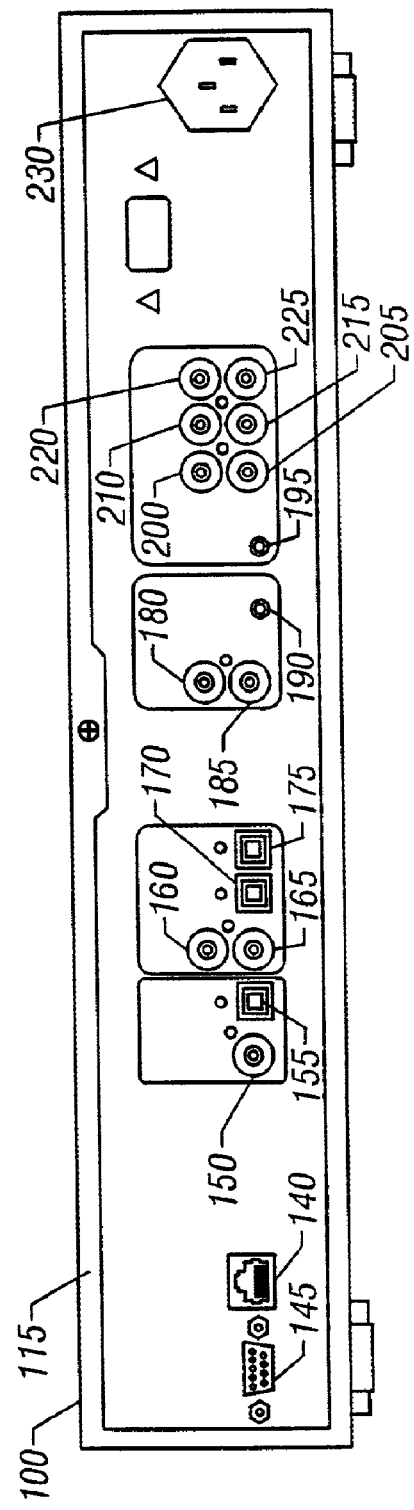

Referring to FIGS. 1 and 2, a digital audio server (DAS) 100 is a networked audio component that also may be referred to as an Internet appliance. The DAS allows a standard stereo component, such as a CD player, a DVD player, a receiver, a tuner, or a tape recorder, to be connected to an Ethernet network. An important feature of the DAS is its ability to interface a standard stereo component to a personal computer ("PC") network. This provides access to MP3 or other digital audio files as well as control of stereo equipment connected across the network. The DAS may be implemented, for example, as a Lansonic Digital Audio Server (DAS-750-Pro), available from Digital Voice Systems, Inc., of Burlington, Mass. A product sheet for the Lansonic DAS-750-Pro is included in the attached Appendix.

The DAS 100 includes a black metal enclosure 115 that is designed to look and feel like a traditional high-end stereo component. The enclosure is typically made from dark painted aluminum. User interaction with the DAS is provided through a LCD display 120 that presents information to the user. The user can directly control the DAS with a remote control through an infrared (IR) port 125, or with a user input control dial 130 and a standby switch 135. The control dial 130 is turned left or right to navigate up or down through a list of available files and functions, and is pushed to select a desired file or function. The control dial, the display screen, the IR port, and the other ports and connectors are accessed by the user through openings in the enclosure.

The DAS 100 includes an Ethernet network port 140 for connection to a local area network (LAN), and is able to play MP3 files from personal computers on the network or directly from an internal hard drive. The DAS is capable of playing streaming files from the Internet or encoding files in real time for streaming to another location on the network. The DAS also supports a serial copy management system and automatic look up of audio data through a CD database. Different types of network ports, such as satellite or terrestrial broadcast, cable, USB, IEEE 1394 (Firewire), HomePNA (also referred to as HPNA), or wireless, may also be used to provide various degrees of network functionality.

The DAS 100 also includes a serial input/output device in the form of a RS-232 port 145. Other digital ports include a coaxial digital output 150, an optical digital output 155, coaxial digital inputs 160 and 165, and optical digital inputs 170 and 175. The DAS also has analog outputs, including RCA outputs 180 and 185, and a mini jack 190 for headsets or speakers. Analog inputs of the DAS include a mini jack 195 for a microphone and RCA inputs 200-225. Power is provided through a power cord connection 230.

The DAS combines features of a PC with those of standard stereo equipment. The DAS provides new benefits in the transport, storage, playback, and recording of high fidelity audio material. The DAS is designed to be small and quiet, and to fit the profile of standard stereo equipment. The DAS is also designed for long-term, continuous operation without the need, for example, for regular reboots or software upgrades.

Figure 3:
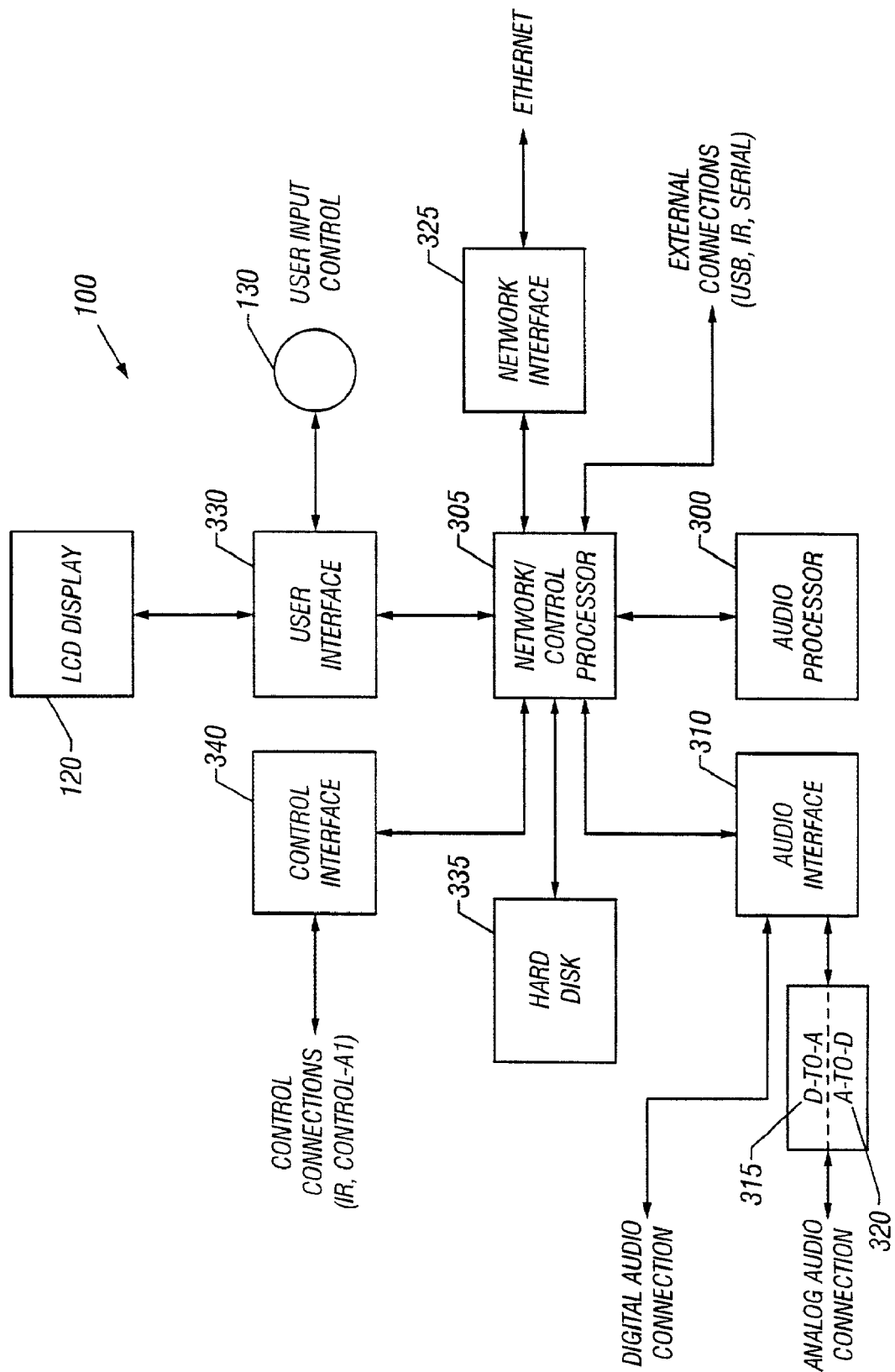
FIG. 3 is a block diagram of the digital audio server of FIGS. 1 and 2.

Referring also to FIG. 3, the DAS features an audio processor 300 and a network/control processor 305. The audio processor 300 interfaces to common analog and/or digital audio components, such as, for example, CD players/changers, MD player/recorders, record players, and tape recorders, through an audio interface 310, a digital-to-analog converter 315, and an analog-to-digital converter 320 using standard analog and digital audio I/O interfaces. All analog inputs are converted into digital audio signals by the analog-to-digital converter 320 prior to being provided to the audio processor 300 through the audio interface 310. Similarly, all analog outputs are produced from digital audio signals sent by the audio processor to the digital-to-analog converter 320 through the audio interface 310. The audio processor 300 operates on the digital audio signals and performs optional compression or decompression depending on the specific operation being performed by the DAS. In addition, the audio processor 300 is connected to the network/control processor 300 for exchange of information between the two processors.

The network/control processor 305 performs most communication and control functions through a number of interfaces on the device. These include a network interface 325 that typically is Ethernet, but also may be, for example, HomePNA, wireless RF (e.g., 802.11b), Firewire (e.g., IEEE 1394), or optical. While the audio processor and the network/control processor are shown as physically separate processors, other implementations may provide the functions of the audio processor and the network/control processor using a single semiconductor device.

The network/control processor 305 further communicates with the user interface 330, which is provided by the LCD display 120 and the user input control dial 130. The network/control processor 305 may also interface with a storage device 335, such as a computer disk drive. Implementations may include other control interfaces 340, such as bi-directional infrared (IR), Control-A1, and serial or parallel interfaces, including RS-232 and USB.

The network interface 325 connects the device to a typical computer network, such as a Local Area Network (LAN) used in a home or office. The network interface allows data and control information to be shared between two or more devices on the network. The selection of Ethernet as the typical network interface allows virtually any number of DASs, computers, printers or other network devices to be connected to, and share, the same physical network using only standard Cat-5 twisted pair cable and a low cost hub.

The network interface 325 enables a number of important features of the DAS. For example, the network interface allows multiple DASs on the same local network to communicate with each other to form a multi-zone system in which the music is stored in one or more main server units containing significant data storage capability (preferably via internal hard disks), and in which the stored music is accessible by each DAS on the local network, including lower cost diskless units that do not include any internal storage and instead access the disks in the main server units. This multi-zone feature allows different music selections to be simultaneously played in different rooms. In addition, the network interface allows the DASs to communicate with PCs on the network, so that MP3 digital audio files (or other file formats) can be shared between the PCs and the DASs, and further allows a DAS to be directly served by a standard Windows PC. Similarly, the network connection allows the DAS to transmit and receive Internet radio (so called "streaming audio") and to perform other operations, such as software updates, over the Internet.

The control interfaces 340 typically include an Infrared (IR) port that is used for control of the DAS from an IR remote control such as is used with most common consumer electronic devices. The DAS also may include an IR transmitter port that can be connected to control standard audio equipment through the IR receivers of such equipment.

In addition, the DAS typically features one or more specialized control ports that provide greater control capability in combination with certain types of equipment. For example, a bi-directional Control-A1 port is used on many Sony CD changers to control and operate the CD changer and to obtain disk information useful in identifying the individual CDs loaded into the changer.

Typically, the DAS also includes a bi-directional RS-232 control port such as is found on many types of equipment. Applications for the RS-232 control port include controlling high-end CD changers (such as the Kenwood DV-5050M, Kenwood DV-5900M, and Denon DCM-5000 CD changers) or other audio devices, and interfacing to home automation systems, such as those sold by Panja, AMX, Crestron, Homevision and others. In a typical home automation application, the RS-232 port allows the home automation system to setup and control which song or collection of songs the DAS is to play, and to access the title/artist/album information stored on the DAS for each song. Such setup and control capability is also typically enabled using the Ethernet or other network interface on the DAS. This network control capability may either be provided through the internal web server of the DAS, as described below, or it may be provided through a dedicated network control port that uses a communication or socket connection to a particular network port # (1966) on the DAS. Either approach allows a device on the network, such as a PC, to send control commands to the DAS and to receive status information from the DAS over the network using standard Internet (TCP/IP and/or HTML) protocols.

In general, the DAS is designed to work in several different configurations. A main server unit typically contains one or two internal hard disks, but other non volatile storage devices, such as flash memory or CD-ROM, DVD-ROM, CD-R, or CD-R/W drives, may also be used. The internal hard disk or other storage devices are preferably mounted using a dynamic noise reduction system to reduce noise. Such a system is described in U.S. patent application Ser. No. 09/633,776, titled "ISOLATING AND REDUCING NOISE GENERATED BY MECHANICAL DATA STORAGE DEVICES" and filed Aug. 7, 2000, which is incorporated by reference.

The internal drives are primarily used to store music, but may also be used to store other data, such as text files or spreadsheets. The main server units (i.e., those with internal storage) also typically function as network file servers, and may employ the SMB network file system used by Windows 95/98/NT/2000/Me, or other network file systems, such as NFS. As discussed in more detail below, the network file server system allows the DAS to emulate a networked PC and to thereby provide full network interoperability with the PC, including "drag and drop" file transfer. The file system on the DAS is managed by the network control processor and provides important benefits for organizing and storing music on the DAS. For example, separate directories (i.e., folders) can be set up to organize music by type (e.g., rock, jazz, classical or country) and/or by, for example, artist or album. In addition, the processor can search music files by date, name, or other criteria to better manage and control the music.

The design of the DAS also facilitates a lower cost diskless configuration that uses the network interface to mount a remote drive physically positioned in another machine (either a PC or a main server DAS) on the LAN. The diskless DAS features the ability to read and write files on the remote drive over the network, thereby allowing the diskless unit to possess most of the same features and capabilities as the main server unit. Furthermore, the diskless unit may read and play one selection of music from the server while other DASs on the LAN are simultaneously playing other selections. This provides a multi-zone capability in which a different DAS is assigned to each zone (a zone may consist of one or more rooms in a home or office) and where each DAS can independently control the music played in its respective zone.

In addition to the internal drives, the DAS can also support external storage to further increase its storage capacity. Various types of network storage devices (e.g., PC-based or stand-alone network drives) are typically supported to permit virtually unlimited expansion of the storage capacity. Similarly, external drives can be added through optional connections such as, for example, USB, Firewire, and SCSI. The DAS's ability to support large internal drives and options to expand further via network or external devices allows the DAS to store and organize large amounts of audio material. Audio material is preferably compressed prior to storage to increase the amount of material that can be stored. However, in some circumstances, no compression may be used to ensure that the music is not altered. A further option is to use lossless compression that eliminates redundant bits from the audio data without changing any of the actual audio samples. This preserves the fidelity of the original data while offering compression ratios averaging about 2-to-1 on a large collection of music.

The DAS combines a network interface and a control interface so that both audio data and control data can be combined for transmission/reception across a network. The DAS uses the standard TCP/IP protocol (the same protocol used by the Internet), which allows the DAS to send and receive data over virtually any distance, provided a connection to the Internet is available. Since the same network used to transport the audio data is also used for control purposes, other non-networked equipment, such as a CD changer, can be controlled from a network device via the DAS's control ports. Similarly, the DAS can be controlled by other network equipment, such as a PC.

Without loss of generality, a PC is used as an example of a networked device throughout this description. However, many other types of network devices, including, for example, PDAs, cell phones, and home automation systems, also can be used with the DAS.

Typically, the DAS includes a built-in web server, which allows configuration and control from any machine on the network running a standard web browser, such as Microsoft Internet Explorer or Netscape Communicator. As a result, a networked PC can use a web browser to interface to the DAS's built-in web server, giving the DAS access via the network to a set of virtual control buttons. The control buttons allow the user at the PC to operate the DAS in a manner similar to the way a traditional CD player is controlled by a user pushing physical buttons on the front of the CD player. For example, the user may use the control buttons to remotely select a play list, go to the next song, or stop or start playing. In addition to controlling the DAS, the PC also can receive from the DAS over the network information related to the audio material that is currently being played, including, for example, song name, artist, and album title. Furthermore, over the same network connection, the PC can access and play or record, through the PC's soundcard, the audio data stored on the DAS using either the DAS's network file system or its streaming Internet radio server.

As described above, the DAS typically features a web server or other network control interface to allow other network devices, such as a network-enabled PC or handheld computer, to control the operation of the DAS over the network (e.g., to pick the music to play, to start, to stop and to pause). This network control capability is readily extended to other devices connected to the DAS through control ports of the DAS. For example, in the context of automatic transfer from multiple audio media, the DAS may be connected to a CD changer through a Control-A1 or RS-232 control port.

The web server in the DAS allows a PC on the network to control both the DAS and the attached CD player, which allows the networked PC to select and play any track on a CD as well as to select the individual CD in a multi-disc player. The DAS can also record and identify the selected CD automatically as described below, all using a web browser or other software to control the DAS over the network. An advantage of this network control feature is that it permits conversion of virtually any networked PC or web device into a powerful, low-cost audio controller. In addition, if the DAS is connected to the Internet, then this network control capability is extended over the entire Internet, providing global range. The network control capability also enable wireless two-way RF control using off-the shelf wireless networking equipment such as equipment that operates according to the 802.11b standard. A particular advantage of this network control capability is that it is bidirectional, which permits a network device to send control commands to direct the operation of the DAS and any audio devices attached to its control ports, while permitting the DAS to simultaneously send back information such as what music is currently playing, as well as a list of all of the music stored by the DAS. This is beneficial for managing and controlling a DAS holding a large music collection that may include many thousands of hours of music.

Figure 4:
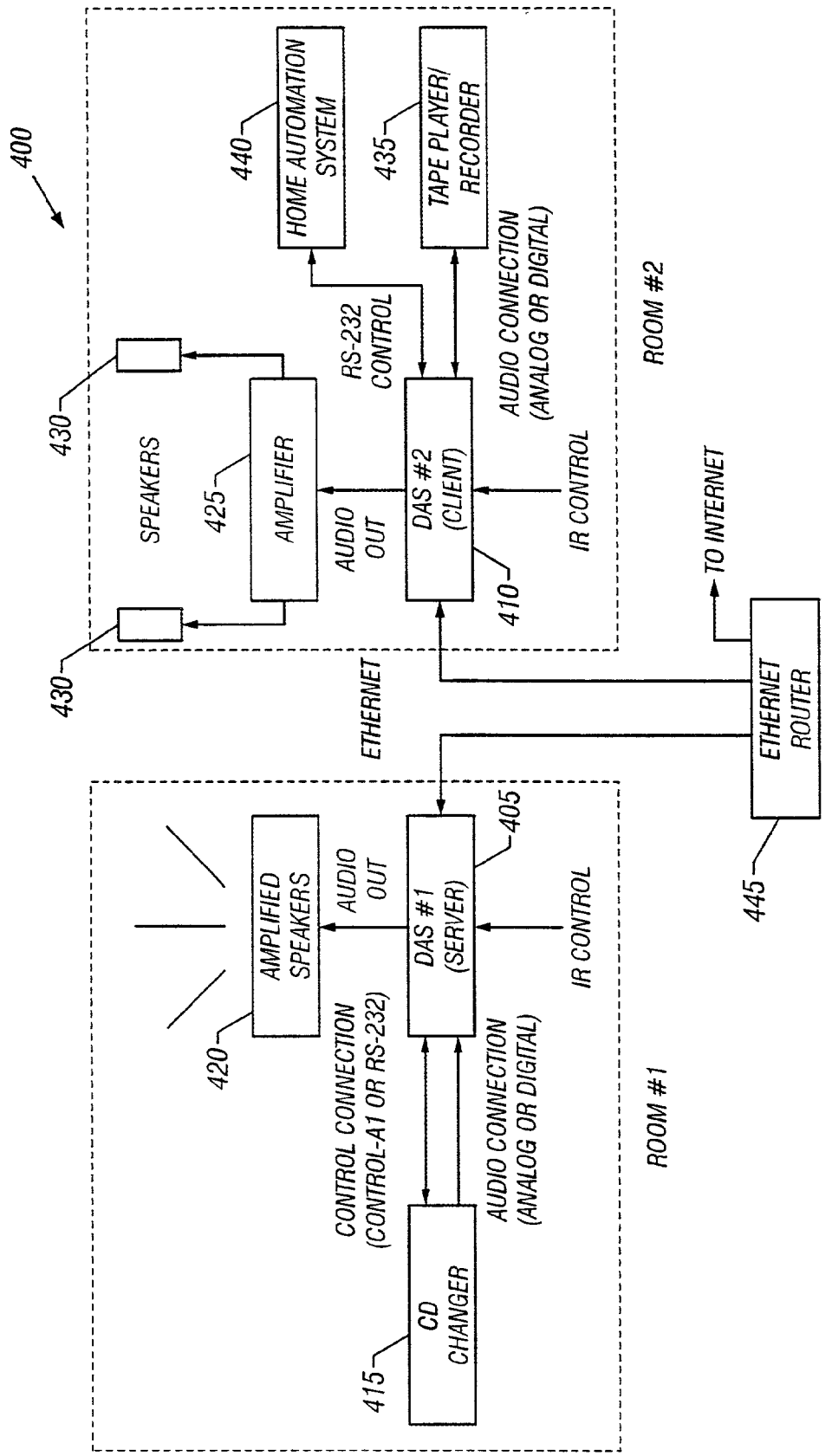
FIG. 4 is a block diagram of a multi-room audio application using the digital audio server of FIGS. 1-3 and Ethernet.

FIG. 4 shows a typical multi-room audio application 400 using two DASs 405, 410. In room #1, a first DAS 405 is connected to a stereo system that includes a CD changer 415 and a pair of amplified speakers 420. The CD changer 415 and the DAS 405 are connected by either an analog or digital (S/PDIF optical or S/PDIF coaxial) audio connection and through a control connection such as Control-A1 or RS-232. The amplified speakers 420 are connected to the audio output of the DAS 405.

In room #2, a second DAS 410 is connected to a second stereo system that includes an amplifier 425, speakers 430, and a tape player/recorder 435. The DAS 410 communicates with the tape player/recorder 435 through an analog or digital audio connection. The amplifier 425 is connected to the audio output of the DAS 410, and the speakers are connected to the output of the amplifier. The DAS 410 is also connected to a home automation system 440 through, for example, an RS-232 connection, so that the DASs and associated devices can be controlled and monitored from other locations in the home.

The DAS 405 and the DAS 410 are connected in a star configuration via an Ethernet network wired through a standard router or hub 445. This configuration allows music stored on either DAS to be played by both stereo systems. As shown, the DAS 405 is a main server unit with an internal hard disk for music storage, while the DAS 410 is a diskless client unit. Both DAS 405 and DAS 410 read and playback music stored on the hard disk in the main server DAS 405. If additional storage were required, DAS 405 and DAS 410 could be equipped with internal hard disks, in which case each DAS would be able to read and play from its own internal drive or from the drives of the other DAS. The DASs can also access the Internet through the router to receive (or transmit) Internet radio, or to receive software upgrades. Both DASs can also accept IR control commands received from a standard IR remote.

The system of FIG. 4 provides for the automated transfer of music from CDs to the internal hard disk storage of the DAS

405. The audio connection transfers the music data played off of any disk in the CD changer into the DAS 405, where the music data can be recorded. The DAS 405 can automate this procedure using the control connection to the CD changer. With such automation, the DAS 405 issues a command directing the CD changer to start playing a CD or a particular track on a CD. The DAS records and optionally compresses the audio data output by the CD changer for that CD, and stores the data on the DAS's hard disk or on some other drive available over the network. When this is completed for all the desired tracks, the DAS continues to issue commands to begin recording other CDs in the changer until all (or some selected subset) have been recorded. In general, audio data on a CD is organized into individual tracks or segments, where each track is typically a single song or movement. The individual tracks are randomly accessible and the CD player or changer can play the tracks in virtually any order.

As discussed in more detail below, the DAS also has the option of reading the CD track information over the control connection and using the track information to look up the name of the CD and the name of all of the individual tracks from a CD database (a process referred to as "CDID™"). The CD database contains CDID data, which typically includes the album title, artist, and song (i.e., track) titles for a large number (typically several hundred thousand) of audio CDs. The CD database may be stored on the DAS's internal hard disk, but may optionally be stored or supplemented by a database stored on a remote machine that may be on the Internet or a local network (for example in a diskless DAS). For example, the DAS 405 may look up a CD using its onboard database containing information for approximately 300,000 CDs, and, if the correct CD can't be found, then the DAS 405 may proceed to looking up the CD by querying one of several Internet CD databases that provide more extensive coverage, such as the databases provided by www.cddb.com or www.freedb.org. When the DAS 405 looks up a CD not found in the onboard database, the DAS adds the CD to the onboard database in case the CD is ever needed again.

The DAS is also able to update its internal (or local) CD database so that the DAS can identify a newly-released CD without having to query an Internet CD database server. In particular, the internal CD database of the DAS is periodically updated so that it contains album/artist/song title information for new releases. For example, the internal CD database of the DAS may be updated with new CDID data collected since the time of the last update. This new CDID data supplements the internal CD database of the DAS to form a larger internal database. This reduces the need for individual queries of an Internet CD database server, since the internal database is regularly updated to include information on new CDs which was not previously contained in internal CD database of the DAS. Such a CD database update can be done over the Internet either automatically (e.g., each week, month or year), in response to user actions (e.g., when the user starts a new recording session or scan, or whenever the user manually requests an update), or whenever the software of the DAS is updated. Another update mechanism is to physically supply a CD-ROM or other media containing the CD database updates, for a user to install on DAS or on or using a networked PC.

There are several advantages of actually updating the internal database rather than querying a remote server whenever a match can't be found. For example, updating the internal database makes the DAS more portable and self-contained since an Internet connection is not required during the CDID process, which allows the DAS to identify new CDs in situations in which an Internet connection is not always available.

The DAS may receive and/or store the internal CD database in a compressed format. Applying compression to the CD identification data reduces the storage space required, which allows CDID to be implemented in lower cost devices. Compression also reduces transmission time to receive CD database updates over the Internet. A number of known data compression or archiving technique (for example, the techniques commonly referred to as ZIP, GDP, RFC1951 or RAR formats) can be used to compress the CD database information by a factor of 2 to 3 times.

Once the DAS or other device has received the compressed data, the data decompressed for use in identifying CDs. In one implementation, the DAS decompresses the CDID upon or shortly after reception and then stores the uncompressed data for use in identifying CDs. This approach reduces the transmission time (or storage) needed to deliver the data to the DAS, but requires more local storage in the DAS for the decompressed data. It is suitable for devices with large amounts of storage available, such as a DAS with a large internal hard disk drive.

Another approach is to store the compressed CD database information and to decompress the CD database information at the time of use.

A particular implementation divides the CD database information into a large number of blocks and compresses each block separately from the other blocks. Typically, each block contains the information for a small number of CDs and a separate index file or hash table is used to indicate the block and the offset into the block for each particular CD. During the CDID process, this index file is used to determine which block needs to be decompressed. Once the particular block is decompressed, the information for the desired CD is located and read from the decompressed block. Since only a single block is decompressed, the amount of decompressed data that is generated is small enough to be stored in temporary (i.e. volatile) memory such as RAM, since it is discarded after the CDID process for that CD is completed. A tradeoff is available between the size of each block (determined by the number of CDs stored per block) and the number of blocks. Having fewer large blocks improves compression and reduces the size of the index file, while having fewer CDs per block reduces the amount of data that must be decompressed and temporarily stored to complete the identification. In one implementation, each block contains the CDID information for approximately 10-100 CDs.

Once the database lookup has identified the particular CD being recorded, the retrieved artist/album/song title information is displayed and used by the DAS during recording to create the filenames for the individual tracks of the CD. For example, the name of each file may be based on the name of the corresponding track as contained in the database. In addition, a so-called ID3 or other identification tag may be embedded into each recorded file for later reference and display during playback of the recorded file. The ID3 tag typically includes the name of the song plus the name, album, artist, genre and year for the CD containing the song. Other information, such as song lyrics, equalizer or volume settings, cover art, copyright management data, or virtually any kind of auxiliary information, also can be included in the identification tag.

In the implementation shown in FIG. 4, the control connection between the DAS 405 and the CD changer 415 in room #1 is a Control-A1 connection that works with Sony CD changers, such as the CDP-CX53 or other models. The Control-A1 interface uses a simple bi-directional protocol that maps commands into a set of pulse lengths on the line, with multiple devices sharing the same line. This interface allows any CD to be selected by causing the carousel in the changer to rotate to the desired position, and also can start and stop playback of any track on the selected CD. In addition, the Control-A1 interface allows disk information including of the number of tracks and the length of each track to be read, which is useful for identification of the CD through a CD database as discussed above. A different implementation using the RS-232 control port on the DAS to connect to other CD changers such as the Denon DCM-5000 provides similar functionality.

The DAS 405 is able to automatically transfer multiple audio media (e.g., CDs) into the DAS's internal hard drive or into a network storage device with little or no intervention on the part of the user. Large CD changers, such as the Sony CDP-CX450, hold 400 disks and can be cascaded for even larger capacity. Other changers are available for other media, such as DVDs. The DAS 405 can operate 24 hours a day to automatically load all of the music on the CDs in the changer without requiring the user to manually input each CD into a CD-ROM drive for "ripping," which provides large benefits in terms of time and convenience. In addition, the DAS 405, working in combination with a CD changer, uses the very robust playback mechanism in the changer, which is designed exclusively for playback of audio CDs. The result is less noise, fewer clicks and pops, and no "jitter" or "sync" errors as often occur with a CD-ROM drive. Thus, the DAS 405 provides a much more reliable procedure that does not require manual monitoring by the user to detect and correct problems. The DAS-enabled approach for automatic transfer or recording of CDs to hard disk allows any compression algorithm (including no compression) to be applied to the audio data as the audio data is input from the CD changer into the DAS. In general, a digital audio connection between the DAS and the CD changer is used for noise-free transfer of the audio data. However, an analog connection may also be used. Other implementations combine the automatic transfer capability of the DAS unit and the multiple audio media capabilities of the CD changer into a single integrated device. Further implementations increase the data rate of the audio from the CD changer (for example by using a Firewire or USB interface for the digital audio data) to a higher rate than the normal playback rate (1411.2 kbps for a typical CD) to allow CDs to be transferred to hard disk at faster than real-time speed.

The system of FIG. 4 also feature an improved technique for manually entering or editing album/artist/song title information associated with the CDID process. In situations in which a CD cannot be identified, it is desirable to have a mechanism to allow the user to enter this information. Alternatively, when a CD is identified through the CDID process, it is desirable to allow the user to edit the album/artist/song title information also as to allow the user to, for example, change data, correct spelling errors, and add more information. The DAS typically includes an internal web server that allows most any device (such as a PC) with a web browser to configure or control the DAS. The new technique features a modified web server with the ability to enter or edit the album/artist/song title information.

The system also features an improved recording method that detects an error, such as might be caused by a scratch, in a CD that is being recorded. Experiments have shown that when certain damaged CDs are played in some multi-disc CD changers, the damage to the CD may cause the CD to play continuously. During a recording session, this can result in the recording stopping at the damaged CD and preventing any other CDs from being recorded. It also can generate a huge recorded file that grows until the recording session is stopped by the user or until the disk drive runs out of space. to the DAS solves this problem by detecting a damaged CD by comparing time information reported by the CD player with the actual recording time. Whenever the recording time exceeds the reported time by some threshold (typically 30 seconds), the DAS issues a command to the CD changer to move to the next track or CD. This limits the length of any recorded file, since the recording of any track is stopped whenever an oversized file is detected. In addition this method prevents a damaged CD from ending an automated recording session since the DAS directs the CD player to move forward, which allows undamaged tracks or CDs to proceed normally. This improved recording system significantly improves the ability of the DAS to record multiple CDs from a multi-disc CD changer onto the hard drive of the DAS.

The configuration shown in FIG. 4 also allows music stored on the disks in the CD changer 415 in room #1 to be played by, and optionally recorded through, the stereo systems in either room. The analog or digital audio output of the CD changer 415 is routed to the DAS 405, where it can be played by the first room's stereo system or recorded in the internal hard disk of the DAS 405. Simultaneously, the audio data is optionally compressed (i.e., encoded) by the DAS 405 and transmitted across the network to the DAS 410 in the second room. Transmission between the DASs uses their streaming mode of operation to provide a direct connection between the two DASs. The DAS 410 reverses any compression applied to the audio data (i.e., decodes it) and outputs the result to the stereo system in the second room. This audio output can be played through speakers and/or recorded on any recording equipment in communication with the DAS 410.

The level of compression that is applied to the audio data transmitted over the network can be determined automatically by the DASs or manually by the user. High levels of compression are necessary if the network bandwidth is limited due to either a low speed network or network congestion caused by a large number of simultaneous network transmissions that have to share limited network throughput. When the two rooms are connected across a wide area network (WAN), such as the Internet, the speed of the connection is often severely limited (e.g., the connection is provided by a 33.6 kbps dial up connection or a 144 kbps DSL line). In contrast, a 10 Mbps LAN connecting two DASs requires little compression (i.e., MP3 at 256 kbps or MP2 at 384 kbps), or even no compression (1.4 Mbps), given the high speed and low number of interfering transmissions. Use of little or no compression ensures that the highest quality audio is transmitted over the network. The DAS may also feature a lossless compression mode in which audio data is compressed by a varying amount, typically between 6-to-1 and 1-to-1, depending on the audio source, but where the compression/decompression is fully reversible so that the original audio samples are left unchanged by the process. Lossless compression provides an average compression rate of approximately 2-to-1, which results in a significant increase in storage and network capacity with the same quality as the original uncompressed music. The DAS 405 may optionally detect the network speed and level of activity and may automatically adapt the amount of compression accordingly.

Automatic Media Identification

Figure 5:
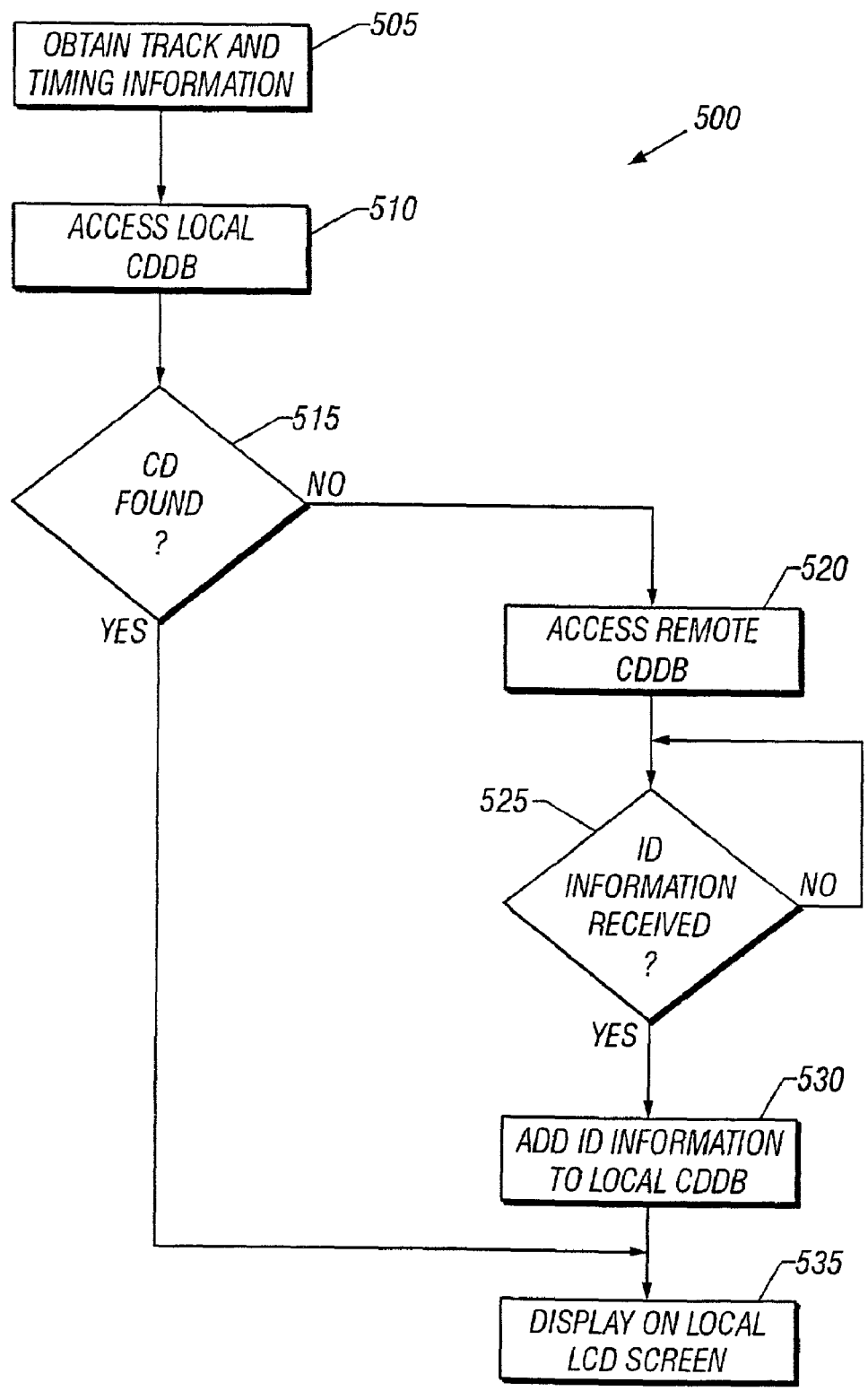
FIG. 5 is a flow chart of a procedure for automatically identifying a CD.

As noted above, the DAS 405 provides a mechanism for automatically identifying the CDs contained in a CD changer 415 (or other media, such as DVDs, contained in associated players). Referring to FIG. 5, identification of CDs is accomplished according to a procedure 500. First, the DAS communicates with the CD changer over the control interface to obtain track information for the CD (step 505), which may comprise the starting and/or finishing time offsets for each track on the CD. The DAS then uses this information to access a local CD database (CDDB) (step 510). If the CD is not found in the local CDDB (step 515), the DAS uses the Internet to access a remote CDDB server that identifies the CD from the supplied information and responds with ID information including artist, title, track name and length (step 520). Upon receiving this ID information (step 525), the DAS adds the ID information to the local CDDB (step 530). Finally, the DAS displays the ID information from the remote or local CDDB on the DAS's LCD screen (step 535).

This process is repeated whenever a new CD is encountered in the changer. It has the advantage that the ID information is obtained automatically without requiring manual input by the user. Furthermore, the system it is not confused if CDs are removed from the changer and then reinserted in a different order. This feature greatly simplifies the management of large CD collections and permits much more information to be presented to the user, compared to a CD changer operating without a DAS.

Figure 6:
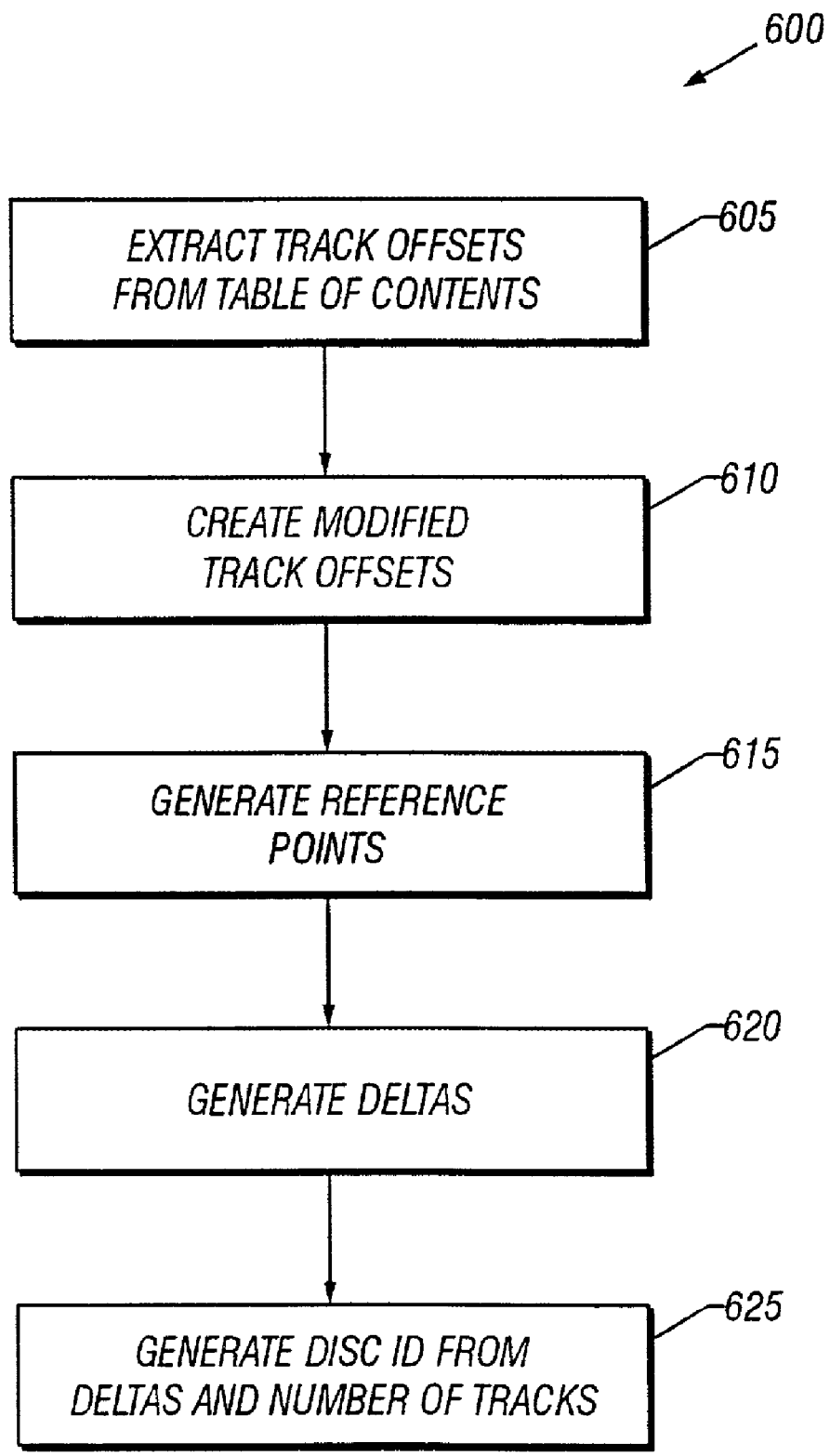
FIG. 6 is a flow chart of a procedure for generating a disk ID for a CD.

Referring to FIG. 6, the DAS may implement an improved procedure 600 for identifying CDs, DVDs, or other audio media from track or segment information. The procedure involves generating a new disc ID from the time offsets for individual tracks and optionally from the number of tracks. As shown, track-offsets representing the starting and/or finishing times for each track or segment are extracted from the table of contents (TOC) for the audio media (step 605). Typically, track-offsets on a CD are integers representing time in $1/75$ of second frames. Modified track-offsets are then created by multiplying each value by $1/75$, truncating to convert to an integer number of seconds, and then subtracting any nonzero value in the first offset from all of the offsets to normalize the offsets such that the first track begins at zero (step 610). In the case of certain CD devices, such as a Sony CD changer connected via a Control-A1 interface, it is not possible to read the table of contents directly. In this case, the track offsets are recreated by integrating the track lengths which can be read from the changer by the DAS.

In general, if there are N tracks, there will be N+1 offsets, as shown in Table 1. In the table, the CD offsets represent the values actually contained in the CD's table of contents and the modified offsets represent valves computed as described above.

TABLE 1

Example Track Time Offsets for 10 Track CD

| n | CD Offsets (n) (in $1/75$ second frames) | Modified Offsets (n) (in seconds) |
|---|---|---|
| 0 | 150 | 0 |
| 1 | 18700 | 247 |
| 2 | 53665 | 713 |
| 3 | 74412 | 990 |
| 4 | 90027 | 1198 |
| 5 | 111730 | 1487 |
| 6 | 140300 | 1868 |
| 7 | 155562 | 2072 |
| 8 | 182102 | 2426 |
| 9 | 198910 | 2650 |
| 10 | 269559 | 3592 |

Next, the modified track offsets are interpolated and resampled to a fixed number, typically 8, of reference points (step 615). Resampling is performed to eliminate the variation due to the number of tracks. To compute the resampled reference points, linear interpolation is typically used to form a continuous function (i.e., a line) between the offsets. The reference points are then calculated at 8 evenly spaced increments between 0 and N, where N equals the number of tracks. For example, for a CD with 10 tracks as shown in Table 1, the reference points are calculated at points (0, 1.25, 2.5, 3.75, 5, 6.25, 7.5, 8.75, 10), where the point at 0 is shown but does not actually need to be stored or calculated since it is always zero. Table 2 shows the 8 reference points calculated in this manner for the modified track offsets shown in Table 1.

TABLE 2

Example Reference Points for Modified Track Offsets shown in Table 1

| k | n = k * N/8 | Reference Points(k) |
|---|---|---|
| 0 | 0 | 0 |
| 1 | 1.25 | 363.5 |
| 2 | 2.5 | 851.5 |
| 3 | 3.75 | 1146 |
| 4 | 5 | 1487 |
| 5 | 6.25 | 1919 |
| 6 | 7.5 | 2249 |
| 7 | 8.75 | 2594 |
| 8 | 10.0 | 3592 |

Once the reference points have been computed from the modified track offsets, they are converted into a set of Deltas starting with the ending reference point (k=8), which is set equal to Delta(0) (step 620). The other endpoint at k=0 is not needed since it is known to always equal zero. The process then computes the mean of the references points bounding the interval k=0 to k=8 (i.e., [Ref(0)+Ref(8)]/2) and subtracts this average from the reference point at the midpoint of the interval (i.e., Ref(4)) to form Delta(1). This process is then repeated for both of the two smaller intervals (k=0 to k=4) and (k=4 to k=8) to compute Delta(2) and Delta(3). The intervals are divided by two again and the process is repeated to compute Delta(4) to Delta(7). Table 3 shows the formulas and the resulting Delta(k) for the reference points shown in Table 2, with all values rounded down to the greatest integer less than or equal to the value.

TABLE 3

Example Deltas for Reference Points shown in Table 2

| k | Delta(k) = | Delta(k) for Table 2 |
|---|---|---|
| 0 | Ref(8) | 3592 |
| 1 | Ref(4) − [Ref(0) + Ref(8)]/2 | −309 |
| 2 | Ref(2) − [Ref(0) + Ref(4)]/2 | 108 |
| 3 | Ref(6) − [Ref(4) + Ref(8)]/2 | −291 |
| 4 | Ref(1) − [Ref(0) + Ref(2)]/2 | −63 |
| 5 | Ref(3) − [Ref(2) + Ref(4)]/2 | −24 |
| 6 | Ref(5) − [Ref(4) + Ref(6)]/2 | 51 |
| 7 | Ref(7) − [Ref(6) + Ref(8)]/2 | −327 |

Changing the number of reference points and deltas is a relatively simple task if the number is constrained to be a power of 2. However, other numbers can be accommodated with minor modifications to the procedure. Using this method, the value of Delta(0) is just the total length of all the tracks, while the remaining Delta(k) for 1<=k<8 represent the difference between the actual reference points and their predicted value, where the prediction is based on other reference points bounding each point. The conversion of the reference points to Deltas removes redundant information, which allows the Deltas to be represented with fewer bits than the reference points. Consequently a given size key (in bits) produced from the Deltas will contain more information or entropy than one of the same size produced from the reference points or the track offsets.

Finally, the Deltas are used to produce a fixed sized (typically 64 bits) disc ID or key by concatenating the number of tracks with a quantized representation of the Deltas (step 625). In one implementation, the number of tracks is represented by a seven bit number since there can be up to 99 tracks on a standard audio CD. Each Delta(k) is then uniformly quantized by multiplying the Delta by a scale factor as shown in Table 4, and then truncating to the greatest integer in the allowed range which is less than or equal to the scaled value. The allowed range is determined by k and the number of bits B, and is [0, 2^B] for k=0 and [-2^(B-1), 2^(B-1)) for 1<=k<8.

As shown in Table 4, an integer offset is added to the integers produced by quantizing each Delta(k) for 0<=k<8 to make them greater than or equal to zero, and the results are concatenated with the number of tracks to form the improved disc ID. The aforementioned quantization process reduces the resolution so that only the most significant bits of each Delta are used in the ID, reducing the likelihood that a small change in the CD timing will create a different disc ID. In addition, the preferred 64 bit length of the disc ID ands its method of construction is such that two different CDs are very unlikely to have the same ID. These properties make this improved disc ID very useful in determining the identity of a CD from its track information.

TABLE 4

Delta(k) Quantization Parameters to produce 64 Bit Key

| k | B = # of Bits | Scale Factor | Integer Offset |
|---|---|---|---|
| 0 | 10 | .125 | 0 |
| 1 | 9 | .125 | 256 |
| 2 | 7 | .125 | 64 |
| 3 | 7 | .125 | 64 |
| 4 | 6 | .125 | 32 |
| 5 | 6 | .125 | 32 |
| 6 | 6 | .125 | 32 |
| 7 | 6 | .125 | 32 |

Table 5 shows an example of the quantization process for the Deltas given in Table 3, and the resulting disc ID, starting with the number of tracks and then the quantized integers k=0 to k=7.

TABLE 5

Disc ID Quantization for Delta(k) in Table 4

| k | Delta(k) * ScaleFactor(k) | Range | Quantization Integer | Quantization Error |
|---|---|---|---|---|
| 0 | 449.0 | [0, 1023] | 449 + 0 = 449 | 0.0 |
| 1 | -38.625 | [-256, 255] | -39 + 256 = 217 | 0.375 |
| 2 | 13.5 | [-64, 63] | 13 + 64 = 77 | 0.5 |
| 3 | -36.375 | [-64, 63] | -37 + 64 = 27 | 0.625 |
| 4 | -7.875 | [-32, 31] | -8 + 32 = 24 | 0.125 |
| 5 | -3.0 | [-32, 31] | -3 + 32 = 29 | 0.0 |
| 6 | 6.375 | [-32, 31] | 6 + 32 = 38 | 0.375 |
| 7 | -40.875 | [-32, 31] | -32 + 32 = 0 | -8.125 |

Disk ID = 0001010 0111000001 011011001 1001101 0011011 011000 011101 100110 000000

In practice, a large database of CD information (e.g., artist, album, song names) is preprocessed to compute the improved disk ID for each CD, and these computed IDs are added to the database as an additional field. Typically, the database is organized such that the CD information corresponding to a given ID can be determined very quickly. The resulting database features reduced size because it is not necessary to store detailed track length information for each record and CD information can be optionally compressed to further reduce storage space. The CD database containing the improved IDs is typically stored in the DAS for use in identifying CDs in a CD player/changer via the control connection of the DAS according to the procedure 500 discussed above.

Typically, the CD database is stored on the internal hard drive of the DAS in one or more database files. The internal database may be organized such that additional database files can be added to increase the size of the database to include more CDs. This ability is advantageous in the context of updating the internal database to include identity information on new CDs not included on the original database. The internal CD database then includes both the original database files plus any additional files added as part of the update. During the CDID process, the DAS searches through all the files that make up the CD database until the DAS finds the CD information for a given disk ID. This ability to search multiple files simplifies the update procedure, since only the new data needs to be added to the DAS, and the existing data need not be modified. The CD database files may be transmitted and/or stored in compressed format.

When an unknown CD is encountered, the CD track information is read by the DAS from the CD changer over the control connection, and the track offsets and the number of tracks are processed according to the procedure 600 to create the improved disc ID. A database lookup of the local CD database is then done using the computed ID and, if a match is found in the database, then the corresponding CD information is used to identify the unknown CD. If no match is found, then optionally a small number of other IDs that are close to the first one can be determined, and these other IDs can be looked up to see if they can be found in the database. If a match is found for one of these other IDs, then the CD information in the database for that ID is used to identify the unknown CD.

The CD identification procedure is very simple to perform and can find a match using only a simple lookup of an ID, even in the presence of minor timing differences between the unknown CD and the same CD stored in the database. This is much faster than prior techniques that required complex processing of stored length information for many records to find a suitable match in the presence of timing differences.

The identification of a CD that contains timing differences relative to the same CD stored in the database can be further improved by use of the optional step of computing other IDs that are close to the one computed first and trying to match these other IDs in the database, whenever a match to the first ID is not found. There are many ways to compute a reasonably small number of other IDs that are close to the first one. For example, the process of quantizing the Deltas can be modified to create other integers that are close to the ones used to compute the first ID, and these other integers are then concatenated with the number of tracks to form a close disc ID.

Another approach is to examine all eight of the Deltas and to rank order them in terms of how close they are to the boundary between the integers representing two neighboring quantization steps. This is equivalent to finding the Deltas with the largest values of |Quantization Error-0.5|. Finding M such Deltas and adding 1 to the respective quantization integer if (Quantization Error>=0.5) and subtracting one to the respective quantization integer if (Quantization Error<0.5) yields 2^M disc IDs that are all very close (within +/-1 for each quantization integer in the ID). One of these disc IDs is the one computed and looked up first, but if the first one doesn't yield a match, each of the other 2^M-1 IDs can be looked up in succession until a match is found. For example, if the three Deltas that are closest to their quantization boundaries are used (k=0, 5, 4 in Table 5), then seven other disc IDs can be computed that are all close to the first one. These other close disc IDs can then be searched if a match in the database cannot be found for the first ID.

Various other methods for generating and searching improved disc IDs may also be used. For example, at the at the expense of a larger key or lower resolution (i.e. smaller quantization scale factors), the reference points rather than the Deltas could be quantized and used in generating the IDs. Furthermore, other methods for creating the reference points could be used, such as varying the interpolation method, changing the number of reference points, or using the track offsets from the CD as the reference points with little or no modification. Also, there are different methods for organizing the CD database and other information can be added to the database to provide other features or options. The method of searching the database also can be modified, and the generation of close IDs may be varied or combined with the search for the first ID.

Compressed CD Database

A compressed CD database format may be used to reduce transmission and/or storage requirements. As described above, the DAS may feature a local CD database stored on non-volatile memory, where non-volatile memory may include magnetic memory such as a hard disk, semiconductor memory such as a flash memory, or optical memory such as a CD-ROM. Typically, the DAS supports updates to the local CD database to supplement the local database to allow the DAS to identify new CDs that were not included previously in the database. For example, every week, month or year the DAS may automatically check one or more sites on the Internet for new CDID data and, if any new data is available, the DAS may download the additional CDID data to supplement the local CD database. Alternately the DAS may download such information only when requested by the user or when a recording session or other action is initiated by a user.

In another variation, the updates to the database are provided via CD-ROM or other data media that is physically provided to the user (for example by mail). In this case, the updated CDID data from the CD-ROM is loaded into the DAS either through a networked PC or other techniques (for example, the DAS may feature the ability to directly read a CD-ROM).

Since data for many CDs may be provided in a single update, the update process is facilitated if the additional CDID data is delivered or transmitted to the DAS in a compressed format. Typically, standard lossless computer data compression methods are applied to the CDID data. Many well known data compression techniques exist and can be applied to compress the CDID data. Well known data compression (or archiving) techniques include, for example, ZIP, GZIP, RAR, etc. . . . These methods exploit the redundancy and non-uniform occurrence found in many types of data. For example, in standard English text a "q" is always followed by a "u" such that the "u" doesn't need to be stored. Similarly, in English, certain letters (for example "e", "a", and other vowels) and certain words ("the", "and", "in") occur more often than other letters or words. By exploiting these properties, data compression can compress English text by factors of approximately 2 to 4 times. These techniques are typically lossless and hence an inverse decompression process can be applied to exactly recover the original text from the compressed data. Such methods can be applied to advantage in delivery and/or storage of CDID information in the context of the DAS or a similar device.

In one implementation, the local CD database includes one or more files that each contain CDID data. Updates, in the form of additional files containing CDID data, are transmitted over the Internet to the DAS and stored on the internal hard disk of the DAS, although a network drive or flash memory can also be used to store all or part of the local CD database. Updates to the CD database are typically transmitted to the DAS in compressed format. For example, in one implementation, a known compression method combining the LZ77 algorithm and Huffman coding and described under RFC1951 is used (see ftp://ftp.uu.net/graphics/png/documents/zlib/zdoc-index.html).

Each file of CDID data may be organized into some number of compressed blocks such that each compressed block can be decompressed independently of the other compressed blocks. The number of compressed blocks in the file is selected to keep the average block size small enough to enable fast decompression but large enough to obtain a high degree of compression for each block. For example, this can be achieved if each block contains CDID data for an average of 10-100 CDs.

Each file of CDID data is accompanied by a hash table containing an entry for every compressed block in the file of CDID data. Each entry in the hash table contains data that includes an offset used to locate the corresponding compressed block in the file of CDID data. The number of entries in the hash table and hence the number of compressed blocks may be chosen to be a prime number. For example, 16381 is prime number which equates to an average of about 30 CDs per compressed block if used with a 500,000 CD database file.

The hash table and file of CDID data are used as part of a lookup procedure which finds the CDID data corresponding to a particular disc ID. This lookup procedure typically is associated with identifying a CD after the disc ID for the CD has been calculated using a method such as that described above. The lookup procedure first processes the disk ID with a hash function that operates on the disc ID and produces a hash value which designates a particular entry in the hash table. The hash function is designed to always produce a hash value that is within the size of the hash table for any possible disc ID. However, the hash value is not necessarily unique. For example, more than one disc ID may produce the same hash value. Methods for selecting good hash functions are well known. One simple hash function used in some implementations is:

[Hash value]=[disc ID]modulo [Number of Entries in Hash Table]

More sophisticated hash functions can be used to randomize or whiten the disc ID to obtain better uniformity in the distribution of CDID data into compressed blocks. Once the hash value is calculated from the disk ID, it is used to select the corresponding entry in the hash table and obtain the offset stored as part of that entry. The offset is used to locate a particular compressed block in the file of CDID data. That particular compressed block is read from the file of CDID data, decompressed, and then searched for the CDID data corresponding to the particular disc ID being sought. In practice, each decompressed block contains CDID data for more than one disc ID although in some cases it may not contain data on any disc ID. This absence of data may be indicated in the hash table so as to eliminate the need to actually read the compressed block.

The lookup procedure is readily applicable to one or more files that each contain CDID data. In the case of multiple files, the lookup procedure typically is applied to each file containing CDID data using the hash table and hash function that are associated with that file. Once the disc ID and CDID data are found in the decompressed data, the lookup procedure stops. Otherwise, it continues with the next file until all the files are tried. If the disc ID being sought is not found in any of the files, then other close disc IDs may be tried as described above. Otherwise a query to an Internet CD database server may be attempted or the DAS may indicate that the CD is unknown and instruct the user to enter the CDID data manually using the web server or through other means.

Automatic Transfer from Multiple Audio Media

Figure 7:
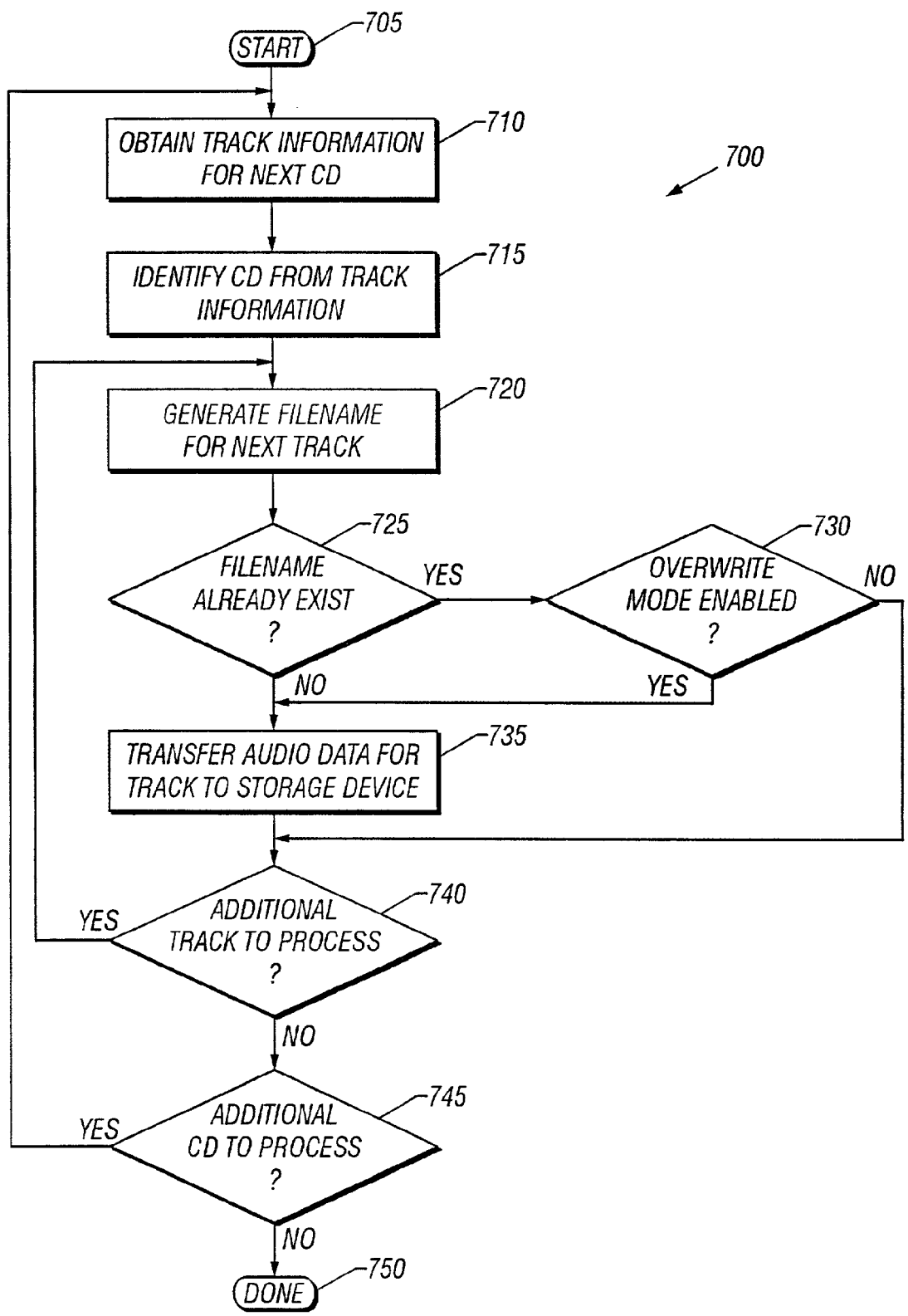
FIG. 7 is a flow chart of a procedure for automatically transferring music from multiple media.

As noted above, the DAS 405 may be used to automatically transfer (i.e. record) audio data (i.e., music) from all or several CDs in a CD changer 415 (or from multiple other media such as DVDs in a DVD changer) to a storage device such as a hard disk. The storage device may be internal to the DAS or on the network. Referring to FIG. 7, automatic transfer of music is accomplished according to a procedure 700. Once automatic transfer is started (step 705), the DAS obtains track information for the next CD to be transferred (step 710). In one implementation, track information is obtained by reading track lengths and other information over a Control-A1 interface. Typically, the processing of CDs by the DAS 405 starts with the first CD and progresses sequentially through all the tracks for each CD in the changer 415. However, the DAS 405 may allow the user to select only a subset of CDs and/or tracks to be transferred, and the order in which selected CDs and tracks are transferred can be changed. Once track information is obtained, it is used to automatically identify the CD (step 715), typically by computing a disk ID in accordance with the procedures described above. In one implementation, the identification of the CD supplies the CD name, the artist name, and the name of all the tracks from an extensive CD database.

The identification of the CD is followed by creation of the filename (step 720) for the next track on the CD to be transferred, typically beginning with the first track. In one implementation, the filename for a track is created from a combination of the CD name, the artist's name, the track number, and the name of the track. Alternatively, the DAS 405 may store tracks in a hierarchical (i.e., tree) structure starting with genre and including artist and album title as separate subdirectories, followed by the song name to designate the filename for a particular track. Once the complete filename is created, it is checked to see whether it already exists (step 725) and whether overwrite mode is enabled (step 730). If a filename doesn't exist or if overwrite mode is enabled, then the corresponding audio data for that track is transferred from the CD changer to the designated storage device (step 735). The transfer may include compression of the audio data to reduce the size of the file. If the file does exist and overwrite mode is not enabled, then the transfer for that track is skipped. Typically, overwrite mode is an option set by the user to force CDs to be retransferred, for example, when the previous files are corrupted or when a different method of compression is to be applied. Once a track has been processed, a check is made as to whether there are any more selected tracks on the current CD to be processed (step 740). If there are more tracks, then the next track is processed beginning with creating a filename (step 720). If all tracks on the current CD have been processed, then a similar check is made to determine whether there are any more selected CDs to process (step 745). If there are more CDs, then the next CD is processed beginning with obtaining track information (step 710). Once all CDs are processed, the automatic transfer is completed (step 750).

In a variation to the above procedure, the DAS 405 may separate the identification of CDs in the changer 415 from the transfer of audio data to a digital storage device into two different passes through the selected CDs. In a first pass, the DAS 405 obtains track information (step 710) and identifies each selected CD (step 715) through the CDID process. The identity information obtained during this first pass is stored in a table, cache or database which is readable by the DAS 405. For example, the table may be stored on the internal disk drive of the DAS. In a second pass, the DAS re-sequences all the selected CDs using the previously stored identity information to create the filenames, and then transfers (i.e. records) the audio data using the described procedure. The use of a two-pass procedure is advantageous, for example, when an Internet CD database server is used to identify the CDs. Using this approach, an Internet connection is only required to obtain the identity information during the first pass of the processing, which can typically be completed in a matter of minutes. During the much longer second pass, which may take many days to complete, the Internet connection is not required, since all the CD identities have been obtained and stored locally. Hence, the user does not need to tie up a phone line for many days (i.e., for Internet access), while all the CDs are being transferred. Another advantage of this two-pass procedure is that it allows the user to check the results of the first pass and take appropriate steps before starting the second pass. Typically, the two passes are each manually initiated by the user (the first pass may be referred to as a "Scan" and the second pass may be referred to as a "Record"), so the user can remove unidentified or improperly identified CDs from the recording session or manually correct or enter the album/artist/song title information prior to recording. This ensures that the ID tags embedded into each recorded file contain the correct information. As an added feature, the DAS 405 may optionally use the gathered CD identity information (e.g., CD name, artist name, genre, year, and song names) to update a local database of available music. The database may be browsed using the interface of the DAS 405, or using an associated PC, and permits selection of available songs by, for example, genre, year, artist, album title, song title, and lyrics. The DAS 405 may also be configured to monitor all audio devices connected to the DAS 405, and to transfer and store music from any new media inserted into any of the audio devices. For example, the DAS 405 may be configured scan the contents of a CD changer after each time that the CD changer is opened, and to transfer music from any CD from which music was not previously stored. In one implementation, the DAS 405 determines that music was not previously transferred from a CD by comparing the disk ID for the CD to a table of disk IDs for CDs from which the DAS 405 has previously transferred music.

Audio Recording with Error Detection

The DAS 405 features an improved recording method that includes the ability to detect errors in an audio medium such as a CD or DVD. This feature is advantageous during the recording of music from a CD player 415 onto a storage device such as a hard disk drive. Errors in a CD can be caused by scratches, manufacturing defects, dust, and fingerprints and can interfere with the proper reading and tracking of a CD. In some cases, these errors can cause the CD player to skip to the next track or disc, stop operation, drop audio data, or get stuck in a perpetual loop. Any one of these problems can seriously interfere with an automated recording system. In particular, the perpetual loop problem (where the CD changer repeatedly plays the same section of music) halts normal recording and can generate huge files on the hard disk if left in this state for extended periods of time. To prevent this problem, the DAS includes a method for detecting such errors in a CD or other audio medium.

A number of different techniques for detecting errors in the CD can be employed. One technique is for the DAS 405 to periodically query the CD player over the control interface to obtain the current playback time. Typical CD players used with the DAS report the current playback time relative to the beginning of the current audio track, so every time a new audio track is started the current playback time is reset to zero. Note that in other CD players the time data provided by the CD player may be relative to some other point, such as the beginning of the CD or the end of track, but such variation is easily accommodated. In any case, the DAS periodically (for example every second beginning shortly after the start of the track) queries the CD player for the current playback time.

Typically, the first response following the beginning of a new track is used to set an internal time counter maintained by the DAS. This internal time counter is then incremented by the DAS, typically every fraction of a second, to allow the DAS to accurately maintain its own time measurement. The DAS also compares this internal time counter against the current playback time provided by the CD player after each query. If the two values differ by more than a predetermined amount (typically 30 seconds), or if the CD player fails to respond after several retries, then an error is detected and the DAS directs the CD player to advance to the next audio track (or to the next CD after the last audio track of a CD contained in a multi-disc CD changer) using the control interface.

In the absence of an error on the CD, the internal time counter of the DAS and the current playback time provided by the CD player should be nearly equal (to within a few seconds). However, when the CD has an error, the current playback time can deviate substantially from the internal time counter maintained by the DAS. This deviation is due in part to the way the playback time is computed in many CD players. Audio data on a typical audio CD is organized in frames that represent 1/75th of a second. When the audio data is read the CD player can use the frame number to indicate time which can be reported over the control interface. However, an error on the CD that causes some number of frames to be skipped, will cause a discontinuity in the reported time. Similarly, a perpetual loop where the same frames are repeatedly read off the CD will cause the reported time to loop in a similar way or will cause the CD player to stop reporting time. These error conditions can all be quickly detected by the DAS. In addition, the error detecting techniques can be combined with further recording safeguards to ensure the recording time for a track and/or a CD do not exceed certain limits and to ensure that the DAS knows which track and CD are currently being played.

Use of Network File System

As mentioned above, the DAS 405 and associated devices may implement a network file system for use in managing digital audio files. For ease of discussion, implementation of such a system is discussed with respect to a network of simplified audio devices. However, the implementation and the network file system are equally applicable to a system including the DAS 405.

Figure 8:
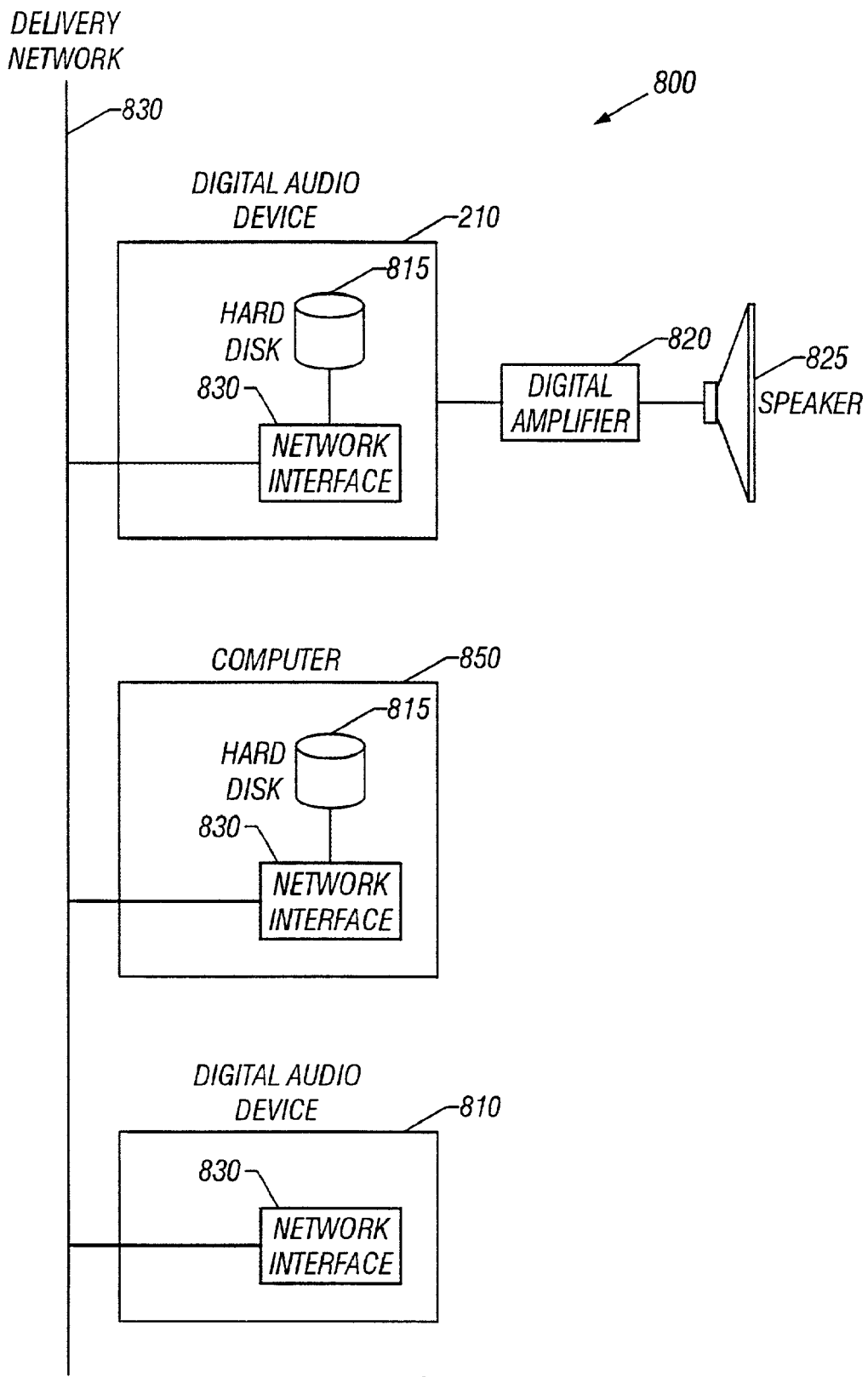
FIG. 8 is a block diagram of a digital audio device having a hard disk, a digital amplifier, and a speaker, and connected to a computer and another digital audio device by a delivery network.

Referring to FIG. 8, a digital audio system 800 includes a digital audio device 810 with a hard disk 815, a digital amplifier 820, and a speaker 825. The digital amplifier 820 receives digital audio information from the audio device 810 and produces an analog signal that is provided to the speaker to produce an audio output.

A network interface 830 of the device 810 is connected to several computer devices by a delivery network 840. Examples of a delivery network include the Internet, the World Wide Web, WANs, LANs, analog or digital wired and wireless telephone networks, radio, television, cable, satellite and/or any other delivery mechanism for carrying data. As shown, the computer devices include a computer 850 with a disk drive 855 and a network interface 830, and a digital audio device 860 with a network interface 830.

Figures 9A, 9B:
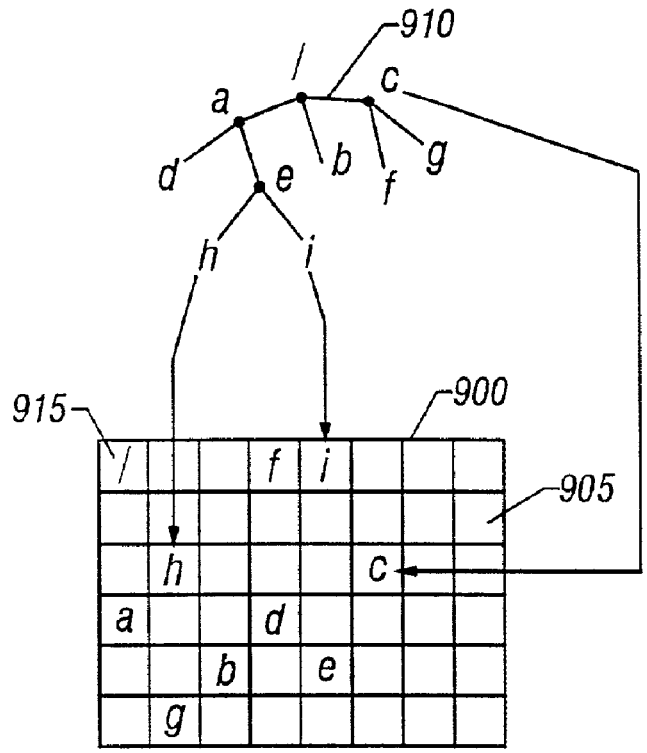
FIG. 9A is a diagram showing digital audio information stored on a hard disk using a block storage system.
FIG. 9B is a diagram of the files and directories corresponding to the file structure of FIG. 9A.

Referring to FIG. 9A, digital audio information is stored on the hard disk 815 using a block storage system 900. In the system 900, disk blocks 905 hold the data defining the structure of the file system and the data in each file. A file structure 910, which is stored in the first block 915, is responsible for associating file and directory names with disk blocks. The file structure 910 is a hierarchical tree including directories at the nodes (branches) and files at endpoints (leaves). Files are named and located by starting at the root and concatenating the names of the nodes until an endpoint is reached. FIG. 9B shows the files and directories corresponding to the file structure of FIG. 9A.

A computer may use a network file system to transfer file system data using a delivery network. A network file system allows the computer to make its local storage devices available to other computers on a network. Using the network file system, a remote computer can access files on the network file system as if the files were available locally. This gives programs that access files the ability to access files on another computer without modification of the programs. This process of providing access to a local storage device is referred to as "sharing" the device.

Figures 10A, 10B, 10C:
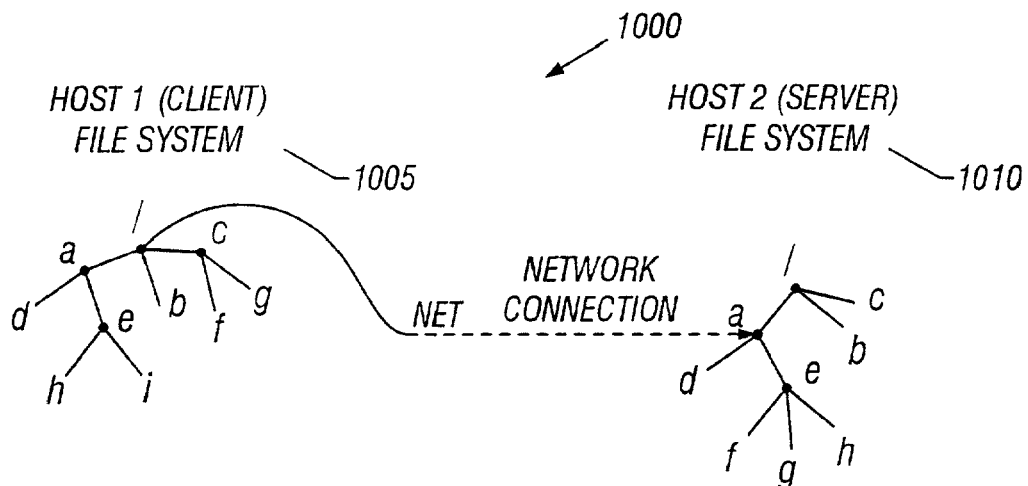
FIG. 10A is a diagram of a file structure of a network file system with two hosts connected to a delivery network.
FIGS. 10B and 10C are diagrams showing the files accessible by Host 1 and Host 2 of the system of FIG. 10A.

FIG. 10A illustrates a network file system 1000 with two hosts 1005, 1010 connected to a delivery network 1015. Each host 1005, 1010 has a file system. Host 1010 (Host 2) shares directory "/a" on the network using a network file system server program. Host 1005 (Host 1) connects to Host 1010 using the client side program of a network file system and incorporates "/a" into its file system hierarchy at point "/net." Host 1005 can access files from the "/a" directory on Host 1010 using the "/net" directory. For example, the file named "/a/e/h" on Host 1010 is referenced on Host 1005 as "/net/e/h."

FIGS. 10B and 10C also show those files accessible by Host 1005 and Host 1010, respectively. As shown, Host 1005 can access its own files plus a subset of the files of Host 1010. Host 1010 can access its own files.

Figure 11:
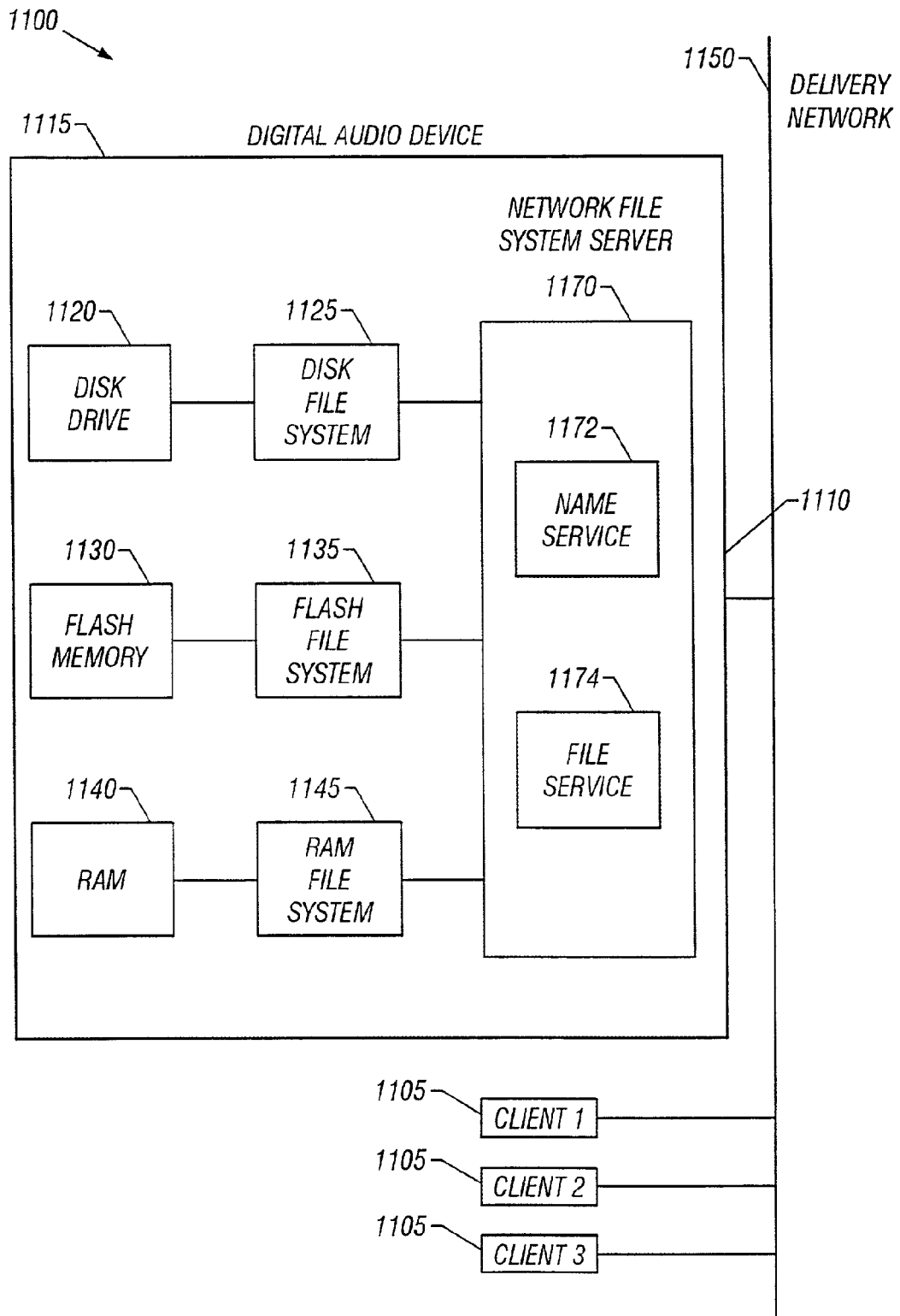
FIG. 11 is a block diagram of a system that permits several clients to access a network file system of a digital audio server that includes a hard disk having an associated file system, a flash memory having an associated file system, and a random access memory (RAM) having an associated file system.

Referring to FIG. 11, a system 1100 permits several clients 1105 to access a network file system 1110 of a digital audio server 1115 that includes a hard disk 1120 and an associated file system 1125, a flash memory 1130 and an associated file system 1135, and a random access memory (RAM) 1140 and an associated file system 1145. The clients 1105 reside on devices other than the digital audio server 1115 and are connected to the digital audio server 1115 by a delivery network 1150.

A network file system server program 1170 acts as an interface between the clients 1105 and the file systems 1125, 1135, 1145 of the local storage devices 1120, 1130, 1140. The network file system server program 1170 has two parts: a naming services program 1172 and a file service program 1174. The naming services program 1172 advertises the names of local files that are accessible to clients on the delivery network 1150. Naming services include advertising the name of the digital audio server 1115 and its accessible file systems to other devices on the delivery network 1150. The file service program 1174 provides file system services to clients that are connected to the delivery network 1160. The file system services 1174 are used by clients 1105 when requesting access to a particular file system on the digital audio server 1115.

Figure 12:
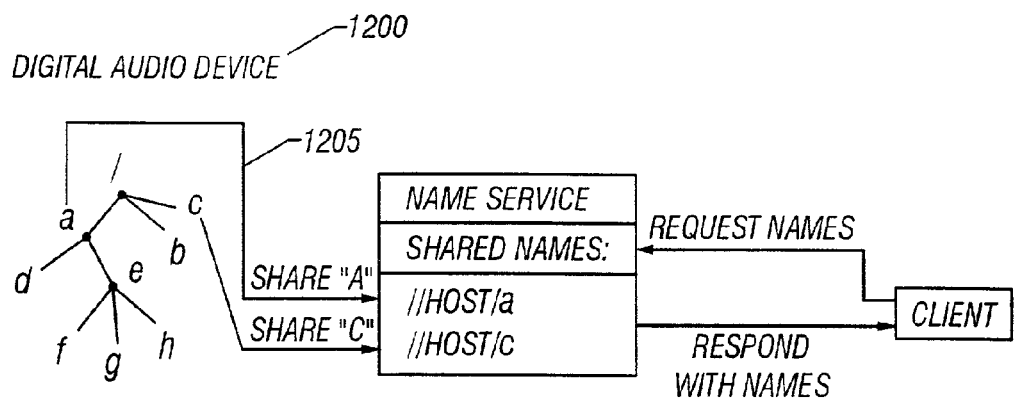
FIG. 12 is a block diagram showing operation of name services running on a digital audio device named Host that also includes a file system.

Referring to FIG. 12, naming services may run, for example, on a digital audio device 1200 named Host and including a file system 1205. As an example, directories "a/" and "/c" are shared with the network using names "//Host/a"

and "//Host/c" respectively by registering the names with naming services. A client may request a list of available file systems from the naming services. The network file system server responds with the names "//Host/a" and "//Host/c".

The network file system on the digital audio device 1200 accepts client connections by way of a delivery network from other devices and provides file system services to the client. For example, these services may include directory services and file services. Directory services include, for example, providing directory listings of local files, creating and removing directories, and providing file attributes and statistics. File services include creating, opening, closing, reading, writing, and seeking files. The services are provided to the client in a way that makes the local file system of the digital audio device 1200 appear local to the client.

A client of the network file system server of the digital audio device may include a device, such as a computer or an audio device, on the network and capable of accessing a network file system. The network file system server may provide access to any file system on a client device, including file systems on hard disks, in RAM, in flash memory, or in any other device presenting a file system interface to the digital audio device.

Figure 13:
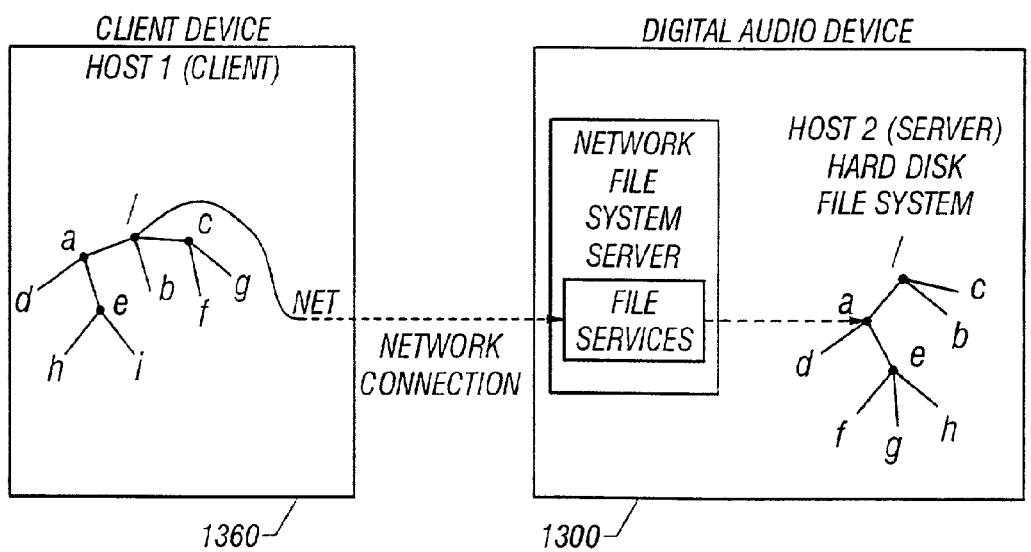
FIG. 13 is a block diagram showing operation of a network file system on a digital audio device.

Referring to FIG. 13, a system may connect a digital audio device 1300 having a hard disk and a network file system server to a client device 1360. As shown, the client device 1360, referred to as Host 1, is able to access the digital audio device, referred to as Host 2, via a network file system. Host 2 is running a network file system server program. Host 1 is connected to the file system services of the server program running on Host 2. Host 2 file services respond to file system requests from Host 1 to make it appear that files on Host 2 are available locally on Host 1.

Host 2 has a client program that contacts a network file system via the delivery network and makes file system requests to the network file system server. The client program accesses the remote network file system server using the same file and directory access functions as it uses to access local file systems. For example, Host 2 may access remote audio files that appear to reside on Host 2's local hard disk. The client program on Host 2 may contact other devices on the network that provide network file system services such as computers, other audio devices, or other network devices that provide network file system services.

Figure 14:
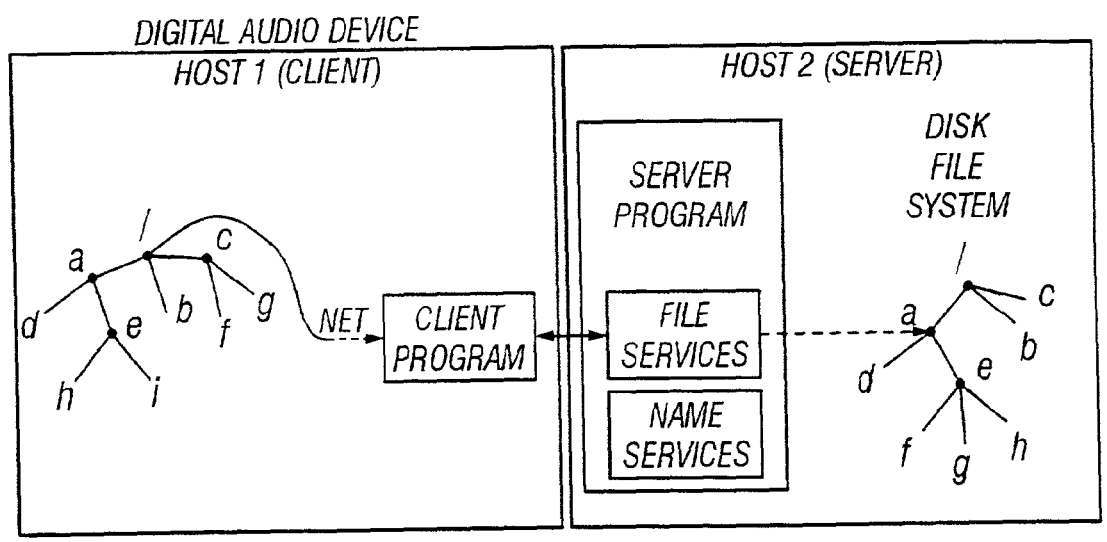
FIG. 14 is a block diagram showing operation of a network file system client program on a digital audio device.

Referring to FIG. 14, a digital audio device may run a network file system client program to access files on other network devices. As shown, by running the client program, access requests to "/net" by the digital audio device, referred to as Host 1, are redirected to the client program which, in turn, directs them to the server program running on a server referred to as Host 2. Host 2 responds to give the appearance that its files reside on Host 1.

Other implementations are within the scope of the following claims.

What is claimed is:

1. An apparatus for recording of signals from multiple discs in is multi-disc playback device, the apparatus including:
a signal input unit configured to receive signals produced by the multi-disc playback device through an audio interface, the signals corresponding to content of a disc being played by the multi-disc playback device;
a communications unit configured to communicate with the multi-disc playback device using a control interface to obtain information about a disc played by the multi-disc playback device, wherein the control interface is different from the audio interface; and
a storage unit configured to store the signals received from the multi-disc playback device,
wherein storage of the signals is controlled based on the obtained information about a disc played by the multi-disc playback device.

2. The apparatus of claim 1 wherein:
the discs are audio compact discs;
the multi-disc playback device is a disc changer capable of audio playback from the audio compact discs; and
the signals are audio signals.

3. The apparatus of claim 2 wherein the signals are analog audio signals and the storage unit is configured to store the analog, audio signals as digital values.

4. The apparatus of claim 2 wherein the signals are S/PDIF digital audio signals.

5. The apparatus of claim 1 further comprising a network interface unit.

6. The apparatus of claim 5 wherein the network interface unit comprises an Ethernet interface.

7. The apparatus of claim 5 wherein the network interface unit comprises an HPNA interface.

8. The apparatus of claim 5 wherein the storage unit is accessible over a network through the network interface unit.

9. The apparatus of claim 8 wherein the storage unit comprises a hard disk drive.

10. The apparatus of claim 9 further comprising a compression unit configured to compress the audio signals using an audio compression method, wherein the storage unit is configured to store the compressed audio signals on the hard disk drive.

11. The apparatus of claim 1 wherein the communications unit composes Control-A1 interface.

12. The apparatus of claim 1 wherein the communications unit comprises an RS-237 interface.

13. The apparatus of claim 1 wherein the multi-disc playback device is included as part of the apparatus.

14. The apparatus of claim 1 further comprising a controller configured to detect an error nit a disc and to discontinue storage of received signals corresponding to the disc when an error is detected.

15. The apparatus of claim 14 wherein the controller is configured to detect the error by:
obtaining through the communications unit playback time information for the disc from the multi-disc playback device;
measuring a duration of a period in which received signals correspond to the disc; and
comparing the playback time information with the measured duration and determining that the error exists it the comparison indicates a difference that exceeds a threshold amount.

16. The apparatus of claim 1 wherein the signal input unit and the communications unit share a common physical interface.

17. The apparatus of claim 16 wherein the physical interface comprises Firewire compatible interface.

18. The apparatus of claim 1 wherein the apparatus reads signals from the multi-disc playback device at a rate greater than a real-time playback rate of the multi-disc playback device.

19. A system for recording or playback of signals from multiple discs in a multi-disc playback device, the system including:
a signal input unit configured to receive signals produced by the multi-disc playback device through an audio interface, the signals corresponding to content of a disc being played by the multi-disc playback device;

a communications unit configured to communicate with the multi-disc, playback device using a control interface to obtain information about a disc played by the multi-disc playback device, wherein the control interface is different from the audio interface;

a storage unit configured to store the signals received from the multi-disc playback device; and a database containing data concerning multiple discs.

20. The system of claim 19 wherein the database is at least partially compressed.

21. The system of claim 20 wherein:
at least part of the database is divided into multiple blocks, and
each block can be decompressed without fully decompressing the other blocks.

22. The system of claims 19 wherein:
the communications unit obtains from the multi-disc playback device signature information for the disc being played by the multi-disc playback device; and
the system uses the signature information to identify the disc by obtaining from the database data corresponding to the signature information.

23. The system of claim 22 wherein:
the discs are audio compact discs;
the multi-disc playback device is a disc changer capable of audio playback from the audio compact discs; and
the data in the database includes one or more of the name of the compact disc, the name of the artist who recorded the compact disc, the number of audio tracks on the compact disc, or the name of one or more audio tracks on the compact disc.

24. The system Of claim 23, wherein:
the signature information includes time offset information on one or more tracks on the compact disc,
the signature information is used to compute at least one disc ID for the disc, and
the database is searched for the data corresponding to the computed disc ID.

25. The system of claim 24, wherein said database is searched by computing a hash value from the disk ID and using the computed hash value and is hash table to obtain an index value indicating the location of the desired data.

26. The system of claim 25 wherein the index value indicates a particular compressed block that is decompressed to obtain the desired data.

27. The system of claim 22 further comprising a signal output unit configured to output a second signal while the signal input unit receives signals.

28. The system of claim 27 wherein:
the second signal is a modified version of the signals received, by the signal input unit; and
the modification may include delay, sealing or equalization.

29. The system of claim 19 further comprising a network interface unit configured to receive additional data for use in supplementing the database.

30. The system of claim 29, wherein the system is configured to use the network interface unit to check for the availability of additional data and to automatically download the additional data if available.

\* \* \* \* \*